United States Patent
Fujiwara et al.

(10) Patent No.: US 8,559,173 B2
(45) Date of Patent: Oct. 15, 2013

(54) ELECTRONIC APPARATUS PROVIDED WITH COOLING STRUCTURE

(75) Inventors: Norio Fujiwara, Osaka (JP); Naoyuki Ito, Osaka (JP); Toshiya Senoh, Nara (JP); Jun Sato, Osaka (JP); Masahiko Kitagawa, Shiga (JP); Shinya Ogasawara, Hyogo (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 12/983,973

(22) Filed: Jan. 4, 2011

(65) Prior Publication Data
US 2011/0222237 A1    Sep. 15, 2011

(30) Foreign Application Priority Data

| Mar. 15, 2010 | (JP) | 2010-057053 |
| Mar. 15, 2010 | (JP) | 2010-057069 |
| Mar. 15, 2010 | (JP) | 2010-057070 |
| Mar. 15, 2010 | (JP) | 2010-057071 |
| Mar. 23, 2010 | (JP) | 2010-066069 |
| Mar. 23, 2010 | (JP) | 2010-066070 |

(51) Int. Cl.
*H05K 7/20*    (2006.01)

(52) U.S. Cl.
USPC ............... 361/679.48; 361/679.49; 361/690; 361/694; 361/695

(58) Field of Classification Search
None
See application file for complete search history.

(56) References Cited

U.S. PATENT DOCUMENTS

| 4,449,579 | A | 5/1984 | Miyazaki et al. |
| 6,084,769 | A * | 7/2000 | Moore et al. ............. 361/679.47 |
| 6,643,129 | B2 * | 11/2003 | Fujiwara ................. 361/679.47 |
| 6,654,242 | B2 | 11/2003 | Ogawa |
| 6,654,247 | B1 | 11/2003 | Lee |
| 6,728,102 | B2 * | 4/2004 | Ishikawa et al. ......... 361/679.48 |
| 6,778,391 | B2 * | 8/2004 | Inoue ............................ 361/695 |
| 7,289,320 | B2 | 10/2007 | Chang et al. |
| 7,336,488 | B2 * | 2/2008 | Inoue ........................... 361/700 |
| 7,336,489 | B1 | 2/2008 | Chen et al. |
| 7,405,930 | B2 * | 7/2008 | Hongo et al. ............ 361/679.48 |
| 7,525,802 | B2 | 4/2009 | Yu et al. |
| 7,649,736 | B2 * | 1/2010 | Hongo ..................... 361/679.47 |
| 7,861,767 | B2 * | 1/2011 | Mukasa ....................... 165/80.3 |
| 7,872,864 | B2 | 1/2011 | Mongia et al. |
| 8,238,100 | B2 * | 8/2012 | Fujiwara ...................... 361/695 |
| 8,289,715 | B2 * | 10/2012 | Takahara ...................... 361/721 |

FOREIGN PATENT DOCUMENTS

| EP | 1 213 641 | 6/2002 |
| JP | 2005-129694 | 5/2005 |
| JP | 2006-019384 | 1/2006 |
| WO | 2009/080060 | 7/2009 |

* cited by examiner

*Primary Examiner* — Boris Chervinsky
(74) *Attorney, Agent, or Firm* — Hamre, Schumann, Mueller & Larson, P.C.

(57) ABSTRACT

An electronic apparatus includes a first chamber in which a heat generator is arranged and a second chamber separated with a partition from the first chamber. The electronic apparatus is provided with a first cabinet having the partition and an isolation wall that encloses to seal the first chamber, a second cabinet enclosing the second chamber and having an intake port and an exhaust port, a thermoconductive member arranged in the first chamber and connected thermally to the heat generator and to the partition, a heat collecting-radiating member arranged in the second chamber and connected thermally to the partition, and an air blower arranged in the second chamber so as to circulate the air in the second chamber.

12 Claims, 8 Drawing Sheets

ELECTRONIC APPARATUS PROVIDED WITH COOLING STRUCTURE

BACKGROUND

1. Field

The present application relates to an electronic apparatus provided with a cooling structure for removing heat generated by a heat generating unit.

2. Description of Related Art

A conventional electronic apparatus having an electronic component often has a heat collecting-radiating member and an air blower for the purpose of efficiently removing heat generated by a heat-generating unit such as the electronic component. The heat collecting-radiating member is a metallic member having a number of pleats (asperities) for increasing the surface area. The heat collecting-radiating member is called "fin". The air blower is an apparatus for feeding a cooling wind to the pleats. The air blower is called "fan".

A recent portable electronic apparatus is provided with a waterproof structure and a splashproof structure for allowing use of the apparatus in various environments. For providing the portable electronic apparatus with the waterproof and splashproof structures (hereinafter, both structures are called "waterproof property"), for example, it is required that a cabinet having heat-generating electronic components such as CPU is sealed for preventing intrusion of liquids. However, if a cabinet has a sealed structure, it will be difficult to keep a heat-radiating path for radiating heat generated by the heat-generating electronic components.

While the fan is effective for radiating heat collected at the fin, it needs an intake port for introducing outside air and an exhaust port for discharging heat radiated from the fin to the exterior. As a result, impurities such as dust will be mixed easily in the outside air introduced through the intake port, and the impurities will degrade the dustproof property of the electronic apparatus having the fan.

JP 2006-019384 A discloses an electronic apparatus provided with a cooling mechanism including both the waterproof property and the dustproof property. The electronic apparatus disclosed in JP 2006-019384 A has a fan, a heat pipe to conduct heat generated by the CPU to a heat-radiating fin, and a sealant to stop water between the heat pipe and an open hole.

However, since the sealant disclosed in JP 2006-019384 A is formed of soft materials such as monolithic material or adhesives, i.e. so-called paste or rubbers, degradation over age cannot be avoided, and thus the reliability in air tightness cannot be secured.

Furthermore, the sealant disclosed in JP 2006-019384 A lacks mechanical strength, since it is provided to seal by rolling up the wall of the heat pipe that penetrates the open hole, and its complex structure results in poor workability in assembly.

SUMMARY

An electronic apparatus of the present application includes a first chamber in which a heat generator is arranged and a second chamber separated with a partition from the first chamber. The electronic apparatus is provided with a first cabinet having the partition and an isolation wall that encloses to seal the first chamber, a second cabinet having an exhaust port that penetrates a housing that divides the second chamber from external atmosphere, a thermoconductive member arranged in the first chamber and connected thermally to the heat generator and to the partition, a heat collecting-radiating member arranged in the second chamber and connected thermally to the partition, and an air blower arranged in the second chamber so as to circulate air in the second chamber.

DETAILED DESCRIPTION OF THE INVENTION

Hereinafter, embodiments of electronic apparatus will be described with reference to a notebook personal computer (hereinafter, referred to as PC).

(First Embodiment)

Figure 1:
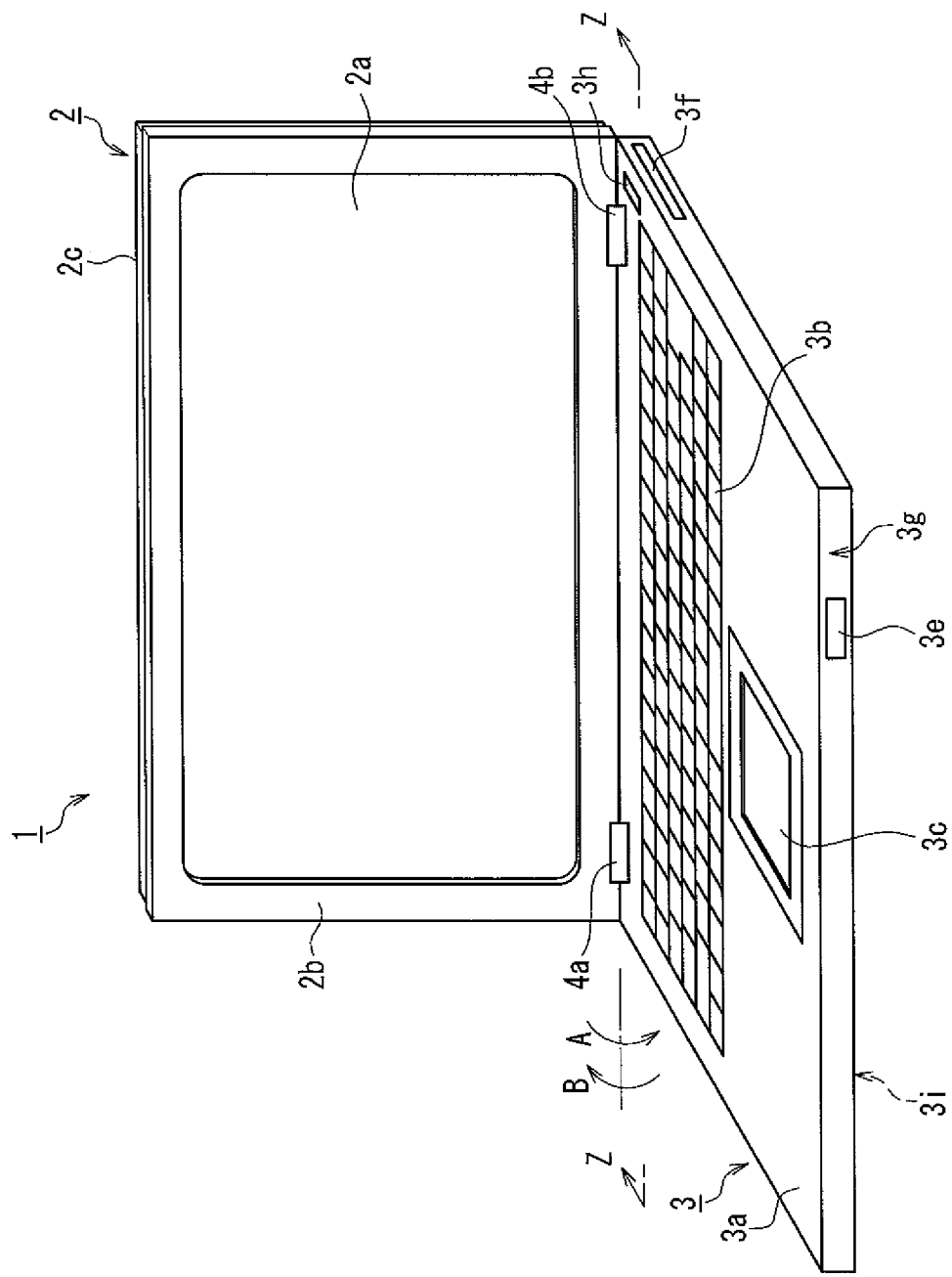
FIG. 1 is a perspective view showing a notebook personal computer as an example of electronic apparatus.

FIG. 1 is a perspective view showing a PC 1 according to the present embodiment.

The PC 1 has a display unit 2 and a main unit 3. The display unit 2 and the main unit 3 are combined to each other so as to be opened and closed by hinges 4a and 4b in the direction indicated with arrow A or B.

The display unit 2 includes a display panel 2a, a frame 2b, and a back cabinet 2c. The display panel 2a is composed of a liquid crystal display panel or the like. The frame 2b has an opening to define an effective display area of the display panel 2a. The back cabinet 2c is arranged on the back of the display surface of the display panel 2a so as to hold the display panel 2a. The back cabinet 2c is joined to the frame 2b by means of either claw engagement, screwing or the like.

The main unit 3 includes a keyboard 3b, a pointing device 3c, and a power switch 3e. The keyboard 3b is arranged on upper surface 3a of the main unit 3 and has a plurality of keys for enabling the input of arbitrary letters. The pointing device 3c is arranged on the upper surface 3a of the main unit 3 and accepts operations for moving a cursor displayed on the display panel 2a to an arbitrary site. The power switch 3e is arranged on a front surface 3g and accepts operations for turning ON or OFF, the power source of the PC 1. The main unit 3 includes various built-in devices such as a central processing unit (CPU) and a substrate on which the built-in devices are mounted. The main unit 3 includes also various devices other than the above-described ones, which are not explained in the present embodiment.

In a recent PC corresponding to the trends of high function and high speed, the CPU generates a large amount of heat. For this reason, the main unit 3 includes a cooling fan (air blower) for cooling efficiently the CPU (heat generator), an intake port 3h for introducing outside air into the main unit 3, and an exhaust port 3f for exhausting air fed from the cooling fan to the exterior. Preferably the upper surface 3a and a lower surface 3i of the main unit 3 are formed of a metal having high hardness and high electroconductivity in order to improve the impact resistance and to ground electrically its built-in electronic circuit. For decreasing the weight, preferably the main unit 3 is formed of aluminum or magnesium. In the present embodiment, the main unit 3 was formed of magnesium.

Figure 2:
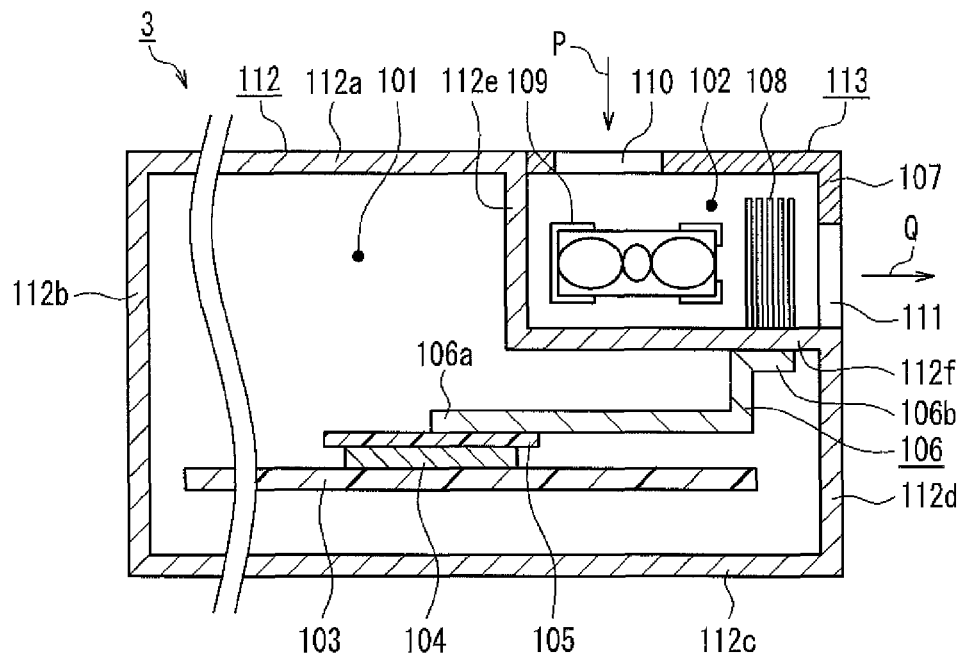
FIG. 2 is a cross-sectional view showing a notebook personal computer according to Embodiment 1.

FIG. 2 is a cross-sectional view showing a cooling structure according to Embodiment 1, taken along the line Z-Z in FIG. 1 for showing the vicinity of the exhaust port 3f and the intake port 3h. As shown in FIG. 2, the main unit 3 is formed basically of a first chamber 101 and a second chamber 102.

In the first chamber 101, a circuit board 103, a CPU 104, a thermoconductive sheet 105 and a heat pipe 106 (thermoconductive member) are arranged. On the circuit board 103, the CPU 104 and other various built-in devices are mounted. The CPU 104 functioning as a calculator and the like for the PC 1 is a component that generates the largest amount of heat. One end part 106a of the heat pipe 106 is fixed to the CPU 104 via the thermoconductive sheet 105, and connected thermally thereto. The other end part 106b of the heat pipe 106 is in contact with a partition 112f of a first cabinet 112 and connected thermally thereto. The heat pipe 106 conducts heat that has been generated at the CPU 104. The heat pipe 106 has a hollow in which a liquid such as water has been injected.

In the first chamber 101, further a hard disk drive, a communication module and various external connection terminals such as a USB (Universal Serial Bus) port, and also a connection circuit for connecting them are arranged, though they are not shown in the drawings for the purpose of simplifying the drawings.

The first chamber 101 is a space enclosed by the first cabinet 112. Namely, the first chamber 101 is sealed by the first cabinet 112. The first cabinet 112 is formed of isolation walls 112a, 112b, 112c, 112d for spatial isolation from the exterior, and also partitions 112e, 112f for dividing the first chamber 101 from the below-mentioned second chamber 102. The respective isolation walls 112a, 112b, 112c and 112d may be casings of the main unit 3 or internal cabinets arranged inside such casings.

Though the first cabinet 112 seals the first chamber 101, the first cabinet 112 may be configured to be disassembled for the purpose of arranging the circuit board 103 on which the CPU 104 is mounted, the heat pipe 106 and the like. For configuring the first cabinet 112 to be disassembled, for example, each of the isolation walls 112b and 112d is divided into two isolation walls, and either a concave or convex that can be fitted to each other is formed on each of the connect-surfaces of the divided parts. And the convex and the concave are brought into butt against each other via a sealant (not shown). Thereby, even if the first cabinet 112 is made to be disassembled, the convex and the concave on the butt-surfaces fit each other and the waterproof property and the dustproof property of the first cabinet 112 can be ensured since the sealant is applied on the fitting boundary.

It is preferable that the area where the CPU 104 and the heat pipe 106 are in contact with each other is made large in order to conduct efficiently the heat generated by, the CPU 104 to the heat pipe 106. It is preferable that the CPU 104 and the heat pipe 106 are in surface-contact with each other. In the present embodiment, the end part 106a of the heat pipe 106 is in surface-contact with the CPU 104 via the thermoconductive sheet 105. For the thermoconductive sheet 105, for example, a graphite sheet, thermoconductive silicone grease or the like can be applied, though the thermoconductive sheet 105 can be eliminated if the CPU 104 and the heat pipe 106 can be connected thermally to each other. It is also preferable that the heat pipe 106 is made of, for example, a metallic material such as copper and aluminum having high thermal conductivity, or a composite material prepared by filling a polyamide resin or a silicone polymer with a high thermoconductive material such as carbon fibers, aluminum oxide, metallic aluminum and the like. In the present embodiment, metallic copper was used.

The end part 106a of the heat pipe 106 is connected thermally to the CPU 104, while the other end part 106b is connected thermally to a partition (the partition 112f in the present embodiment) that separates the first chamber 101 from the second chamber 102. The heat pipe 106 can be joined to or made to be contact thermally with the partition 112f by use of any coupling means such as biasing, screwing, brazing, or welding individually or in combination. Further, it is effective that the interface between the end part 106b of the heat pipe 106 and the partition 112f is filled with thermoconductive silicone grease or the like, for example. In the present embodiment, the interface between the end part 106b of the heat pipe 106 and the partition 112f is filled with thermoconductive silicone grease, and the end part 106b and the partition 112f are joined by screwing and fixed to each other.

It is preferable that the partition 112f is made thinner than the other partition 112e and the isolation walls 112a, 114, 112c and 112d, so that the thermal capacity and/or thermal resistance can be decreased. In the present embodiment, since the first cabinet 112 is formed of metallic magnesium, the thermal conductivity is favorable. If a material such as an organic polymer resin with inferior thermal conductivity is used for the isolation walls 112a, 112b, 112c and 112d, any of the above-mentioned materials suitable for the thermoconductive sheet 105 may be applied at least to the part of the partition 112f to which the heat pipe 106 will be connected thermally. In a case where a plurality of materials are used to form the first cabinet 112, the waterproof property and the dustproof property can be ensured by fixing the materials to each other by using adhesion, heat sealing or the like.

The second chamber 102 is a space enclosed by a second cabinet 113. The second cabinet 113 is formed of the partitions 112e and 112f, a housing 107, an intake port 110, and an exhaust port 111. The second cabinet 113 includes a heat-radiating fin 108 (heat collecting-radiating member) and a cooling fan 109.

The intake port 110 is an open hole formed on the housing 107 for the purpose of introducing cooling air from the exterior. The intake port 110 corresponds to an intake port 3h shown in FIG. 1.

The exhaust port 111 is an open hole formed on the housing 107 for the purpose of exhausting air aspirated from the intake port 110 to the exterior. The exhaust port 111 corresponds to an exhaust port 3f shown in FIG. 1.

The heat-radiating fin 108 is formed to stand on the partition 112f or be connected thermally to the partition 112f.

The cooling fan 109 introduces cooling air from the exterior via the intake port 110, and forcibly feeds the introduced cooling air toward the heat-radiating fin 108 and toward the exhaust port 111.

Therefore, the second chamber 102 communicates with the external atmosphere through the intake port 110 and the exhaust port 111. The cooling fan 109 is joined to either the partition 112e or the housing 107 for example by use of a screw (not shown). In the present embodiment, the cooling fan 109 is joined to the partition 112e by screwing. The cooling fan 109 of the present embodiment has a plurality of blades and a motor for rotating the blades. By rotating the blades with the motor, it is possible to generate airflow in the directions indicated with arrows P and Q.

The heat-radiating fin 108 is joined thermally to the partition 112f. The heat-radiating fin 108 collects heat conducted from the CPU 104 via the thermoconductive sheet 105, the heat pipe 106 and the partition 112f, and radiates the heat. From the viewpoint of thermal conductivity, it is preferable that the heat-radiating fin 108 is formed integrally with the partition 112f or that a plurality of grooves are formed on the partition 112f and the pleats of the fin are embedded in the grooves. However, it is difficult to form integrally a fin having large numbers of pleats with the partition or to embed the pleats of the fin into the partition. Therefore, it is preferable that the partition 112f and the heat-radiating fin 108 are prepared separately and a fixing system such as biasing or screwing is utilized along with a high thermoconductive material interposed on the interfaces, or any other suitable coupling systems such as brazing or welding is applied. In the present embodiment, the heat-radiating fin 108 is connected thermally to the partition 112f via graphite, and joined to the partition 112f with a screw.

The heat radiation operation of the PC 1 will be described below.

When the power switch 3e of the PC 1 is operated by a user in a power-off state, the internal power source circuit is activated, and thus power is fed to the built-in devices or to the internal electronic circuit which are to be packaged or mounted in the respective units such as the CPU 104 in the PC 1. Next, in the case of PC 1 to which an operation system has been installed, the CPU 104 reads out program data from the hard disk drive for the purpose of activating the operation system and executes the activation procedures. When an instruction for executing the application software is inputted by the user after the operation system is activated, the CPU 104 reads out program data from the hard disk drive in order to execute the application software and executes the application software (hereinafter, this is referred to as an active state). Since the CPU 104 operates its own internal electronic circuit at the time of executing the operation system or the application software, its own temperature will rise. In case of a desktop computer, a CPU applied to the computer generally has a protective cover called a lid. On the other hand, since a notebook personal computer as referred to in the present embodiment is required to decrease its thickness, the CPU 104 without such a protective cover is used. As a result, the temperature will rise drastically. The CPU 104 may undergo a thermal runaway after its temperature continues to rise, resulting in failures, for example not accepting instructions from the user.

The PC 1 according to the present embodiment has a heat-radiating structure for preventing the above-mentioned failure.

Specifically, heat generated by the CPU 104 is conducted to the heat pipe 106 via the thermoconductive sheet 105. The heat conducted to the heat pipe 106 is conducted to the partition 112f that separates the first chamber 101 and the second chamber 102. Since the heat pipe 106 is connected thermally to one surface of the partition 112f and the heat-radiating fin 108 is connected thermally to the other surface, the heat generated by the CPU 104 is conducted to the heat-radiating fin 108.

Regarding the cooling fan 109, when the power source of the PC 1 is turned on, the CPU 104 becomes active and starts the operation of rotating the blades. Due to the operation of the cooling fan 109, outside air is introduced into the second chamber 102 via the intake port 110 as indicated with the arrow P and at the same time, the air in the second chamber 102 is exhausted to the exterior via the exhaust port 111 as indicated with the arrow Q.

Since the heat-radiating fin 108 is arranged in the ventilation path formed by the cooling fan 109 from the intake port 110 to the exhaust port 111, the heat is removed by the cooling air flowing in the directions indicated with the arrows P and Q, and there is efficient cooling from the high-temperature state due to the thermal conduction. Since a temperature gradient is formed from the CPU 104 to the heat-radiating fin 108, the cooling efficiency is kept high constantly.

Furthermore, the first chamber 101 is a sealed space. Therefore, for example, even if the PC 1 is used in an adverse environment such as during a rainfall, a liquid such as raindrops will enter only the second chamber 102 via the intake port 110 or the exhaust port 111, but hardly enters the first chamber 101. As a result, there is an extremely low possibility that the liquid adheres to the built-in devices such as the CPU 104 arranged in the first chamber 101 and the internal electronic circuits arranged in the main unit 3, and thus damage to the built-in devices and the internal electronic circuit can be prevented.

Further, since the cooling fan 109 is arranged in the second chamber 102 independent from the first chamber 101, there is an extremely low possibility that foreign matters mixed in the cooling air sucked from the intake port 110 adhere to the built-in devices such as the CPU 104 arranged in the first chamber 101 and the internal electronic circuit arranged in the main unit 3. Therefore, damage to the built-in devices arranged in the first chamber 101 and the internal electronic circuit can be prevented.

Further, since the heat pipe 106 and the partition 112f are joined to each other by screwing, there is a low possibility of the heat pipe 106 and the partition 112f separating from each other even if the PC 1 is subjected to a drop impact or the like. And thus there is a low possibility that the heat-radiating path from the CPU 104 to the partition 112f is ruptured. And since the heat-radiating path has no structure requiring that a mechanically-hard and fragile member such as a sealant penetrates the partition 112f, degradation in the waterproof property and/or dustproof property over time can be minimized.

The cooling fan 109 in the present embodiment is configured to operate irrespective of the amount of heat generation of the CPU 104. Alternatively, since a typical CPU 104 has a thermal diode for temperature detection, a configuration of controlling the drive of the cooling fan 109 in accordance with the detected temperature of the thermal diode can be applied for example. Alternatively, the cooling fan 109 can be configured to control the operation in accordance with the space temperature of the first chamber 101. Using such a configuration serves to suppress the discharge of the battery provided to the PC 1.

The heat pipe 106 in the present embodiment is connected thermally to the CPU 104. Alternatively, it may be connected thermally to any other heat-generating unit. Examples of the heat-generating units to which the heat pipe 106 is connected preferably include a hard disk drive, built-in devices such as a backlight for the display panel 2a, and an internal electronic circuit such as an inverter circuit that controls the backlight.

Though the present embodiment refers to a single heat pipe 106, a plurality of heat pipes 106 may be provided. In addition to the heat pipe 106, it is possible to provide for example a heat pipe that connects thermally the partition 112f and the hard disk drive contained in the PC 1, a heat pipe that connects thermally the partition 112f and an inverter power source that controls the backlight of the display panel 2a, and the like.

The present embodiment refers to the PC 1 as an example of electronic apparatus. Alternatively, the present embodiment can be applied to any kind of electronic apparatus containing a heat-generating unit such as an exterior hard disk drive, a digital video camera, a digital still camera, a projector, and a mobile phone.

(Embodiment 2)

Figure 3:
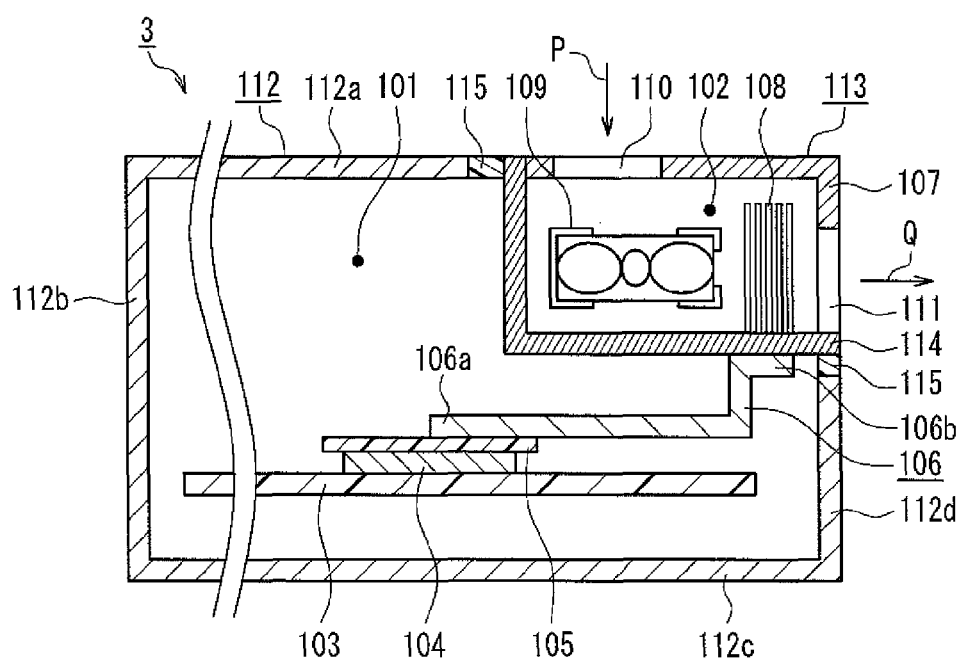
FIG. 3 is a cross-sectional view showing a notebook personal computer according to Embodiment 2.

FIG. 3 is a cross-sectional view showing a cooling structure according to Embodiment 2, taken along the line Z-Z in FIG. 1 for showing the vicinity of the exhaust port 3f and the intake port 3h. In FIG. 3, components similar to those in FIG. 2 are assigned with common marks to avoid duplicated explanation. The second cabinet 113 in FIG. 3 is formed of the housing 107 and a partition 114. A sealant 115 is arranged between the isolation wall 112a and the partition 114, and between the isolation wall 112d and the partition 114.

The end part 106b of the heat pipe 106 and the partition 114 can be joined to each other by using any of various coupling systems such as biasing, screwing, brazing or welding individually or in combination. Further, it is also effective to fill the interface between the end part 106b of the heat pipe 106 and the partition 114 with thermoconductive silicone grease or the like. In the present embodiment, the interface between the end part 106b of the heat pipe 106 and the partition 114 is filled with silicone grease, and the heat pipe 106 and the partition 114 are joined by screwing and fixed to each other.

It is possible to change the thermal characteristics of the partition 114 by making the partition 114 thinner than the isolation walls 112a, 112b, 112c and 112d. It is possible to change the thermal characteristics of the partition 114 by using a high-thermoconductive material and/or a low-thermal capacity material that is different from the material used for forming the isolation walls 112a, 112b, 112c and 112d.

Though the partition 114 and the housing 107 are prepared separately in the present embodiment, the members may be configured integrally. In such a case, the material of the housing 107 is the same as the material of the partition 114.

The material used for the partition 114 is required to have a waterproof property and a dustproof property, and in addition, thermal conductivity superior to the material used for the first cabinet 112. In the case where the partition 114 and the first cabinet 112 are made of materials such as metallic aluminum with excellent thermal conductivity, for the purpose of setting the thermal conductivity of the partition 114 to be higher than the thermal conductivity of the first cabinet 112, it is preferable that the partition 114 is made of a low-thermal capacity material that is thinner than the isolation wall included in the first cabinet 112. In a case where the material for the first cabinet 112 is metallic aluminum for example, it is preferable that the material for the partition 114 is a high-thermoconductive material such as the graphite or the material mentioned as an example for the material of the thermoconductive sheet 105.

When a material inferior in the thermal conductivity (for example, organic polymer resin) in comparison with the partition 114 is used for the first cabinet 112, the material applied to the partition 114 can be selected more freely, and for example, a metallic material such as copper can be used for the partition 114. In the case where the first cabinet 112 is made of a material (for example, organic polymer resin) inferior to the material of the partition 114 in the thermal conductivity and where copper is applied to the partition 114, a significant difference in the thermal conductivity is confirmed.

In this manner, it is possible to determine the material and the configuration of the partition 114 in accordance with the material and configuration applied to the first cabinet 112. However, the material and the configuration may vary also depending on the amount of heat generation of the CPU 104, the thermoconductive efficiency of the heat pipe 106 or the like. In other words, it is preferable that the first cabinet 112 is made of a material that can cool the CPU 104 efficiently. In addition to that, a waterproof property and a dustproof property are required. Therefore, it is preferable that a metallic material and a composite material having thermoconductive filler inside are applied to the first cabinet 112.

The cooling fan 109 can be joined to the partition 114 or to the housing 107 with a screw for example. In the present embodiment, the cooling fan 109 is joined to the partition 114 by screwing. The heat-radiating fin 108 is joined thermally to the partition 114, so that it collects heat conducted from the CPU 104 via the thermoconductive sheet 105, the heat pipe 106 and the partition 114, and radiates the heat. From the viewpoint of thermal conductivity, it is preferable that the heat-radiating fin 108 is formed integrally with the partition 114 or that a plurality of grooves are formed on the partition 114 and the pleats of the fin 108 are embedded in the grooves. However, it is difficult to form integrally the fin 108 having large numbers of pleats or to embed in the grooves or in the wall. Therefore, it is preferable that the partition 114 and the heat-radiating fin 108 are prepared separately and a fixing system such as biasing or screwing is utilized along with a high thermoconductive material interposed on the interfaces, or any other suitable coupling systems such as brazing or welding is applied. In the present embodiment, the heat-radiating fin 108 is joined to the partition 114 via graphite by screwing.

In the main unit 3 as shown in FIG. 3, the heat generated by the CPU 104 is conducted to the heat pipe 106 via the thermoconductive sheet 105. The heat conducted to the heat pipe 106 is conducted to the partition 114. Since the heat pipe 106 is connected thermally to one surface of the partition 114 and the heat-radiating fin 108 is connected thermally to the other surface, the heat generated by the CPU 104 is conducted to the heat-radiating fin 108.

Since the heat-radiating fin 108 is arranged in the ventilation path formed by the cooling fan 109 from the intake port 110 to the exhaust port 111 as indicated with the arrows P and Q, efficient cooling is achieved. As a result, since a temperature gradient is formed from the CPU 104 to the heat-radiating fin 108, the cooling efficiency is kept high constantly.

In the present embodiment, a sealant 115 is provided between the isolation wall 112a and the partition 114, and between the isolation wall 112d and the partition 114. By joining the isolation walls 112a, 112d and the partition 114 via the sealant 115 according to the known technique such as butting, it is possible to seal the first chamber 101 to provide the first chamber 101 with a waterproof structure. Therefore, for example, even if the PC 1 is used in an adverse environment such as during a rainfall, a liquid such as raindrops will enter only the second chamber 102 via the intake port 110 or the exhaust port 111 but hardly enters the first chamber 101. As a result, there is an extremely low possibility that the liquid will adhere to the electronic components such as the CPU 104 arranged in the first chamber 104 and the internal electronic circuit arranged in the main unit 3, and thus damage to the electronic components and the internal electronic circuit can be prevented.

Furthermore, since a thermal insulating material is applied to the sealant 115 in general, the heat that has been conducted to the partition 114 via the heat pipe 106 can be suppressed from being conducted to the isolation wall 112a and/or 112d.

In the configuration, it is preferable that the casing of the PC 1 is formed of the isolation walls 112a, 112b, 112c and 112d for example, since the heat generated by the CPU 104 will not be conducted easily.

The sealant 115 can be eliminated in a case where the isolation walls 112a, 112b, 112c, 112d are formed integrally (shaped simultaneously) with the partition 114. By eliminating the sealant 115, for example, it is possible to improve the drop impact resistance of the first cabinet 112.

Further, since the cooling fan 109 is arranged in the second chamber 102 independent from the first chamber 101, any foreign matters mixed in the cooling air sucked from the intake port 110 will not adhere to the electronic components such as the CPU 104 arranged in the first chamber 101 or the internal electronic circuit arranged in the main unit 3, and thus damage to the electronic components and the internal electronic circuit can be prevented.

Since the heat pipe 106 and the partition 114 are joined to each other by screwing, even when the PC 1 is subjected to a drop impact or the like, there is a low possibility of the heat pipe 106 and the partition 114 separating from each other. Therefore, there is a low possibility of the heat-radiating path from the CPU 104 to the partition 114 being ruptured.

(Embodiment 3)

Figure 4:
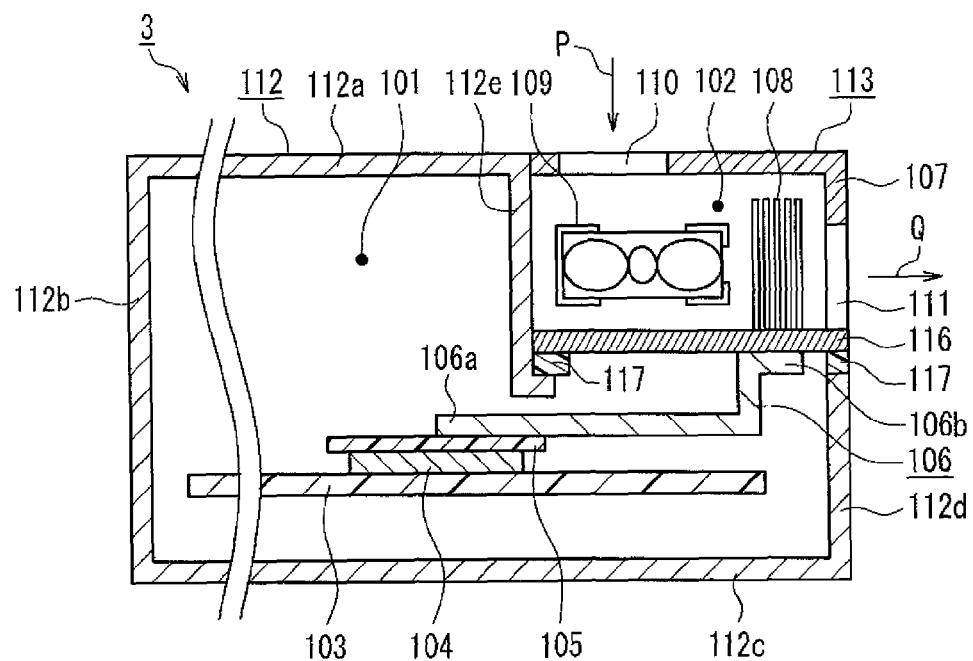
FIG. 4 is a cross-sectional view showing a notebook personal computer according to Embodiment 3.

FIG. 4 is a cross-sectional view showing a cooling structure according to Embodiment 3, taken along the line Z-Z in FIG. 1 for showing the vicinity of the exhaust port 3f and the intake port 3h. In FIG. 4, components similar to those in FIG. 2 are assigned with common marks to avoid duplicated explanation.

The first cabinet 112 is formed of the isolation walls 112a, 112b, 112c, 112d, the partition 112e and a partition 116. The first cabinet 112 seals the first chamber 101. The partition 116 is arranged to close an opening between the isolation wall 112d and the partition 112e. The partition 116 is formed of a high-thermoconductive material and/or a low-thermal capacity material different from the materials used for the isolation walls 112a, 112b, 112c, 112d and of the partition 112e, so that the thermal characteristics can be changed. A sealant 117 is interposed between the partition 116 and the isolation wall 112d, and between the partition 116 and the partition 112e. Thereby, the first chamber 101 and the second chamber 102 are divided spatially, and the first chamber 101 is sealed.

In the present embodiment, one end part 106a of the heat pipe 106 is connected thermally to the CPU 104, and the other end part 106b is connected thermally to the partition 116. The heat pipe 106 and the partition 116 can be joined to each other by using any coupling system such as biasing, screwing, brazing and welding individually or in combination. Further, it is effective that the interface between the heat pipe 106 and the partition 116 is filled for example with thermoconductive silicone grease or the like. In the present embodiment, the interface between the heat pipe 106 and the partition 116 is filled with thermoconductive silicone grease, and the heat pipe 106 and the partition 116 are joined by screwing and fixed to each other.

For the material of the partition 116, a material having higher thermal conductivity in comparison with the material for the other partition 112e, and the isolation walls 112a, 112b, 112c, 112d, is used preferably. Examples of the materials having high thermal conductivity include high-thermoconductive metallic materials such as silver, copper, aluminum, magnesium and the like. Since the partition 116 is not required to have pressure resistance or mechanical strength, it can be made of graphite or the like. The partition 116 in the present embodiment was made of graphite. However, when a material such as an organic polymer resin inferior in the thermal conductivity is used for the isolation walls 112a, 112b, 112c and 112d, conduction of heat that has been conducted to the partition 116 to the isolation walls 112a-112d will be hindered. As a result, the heat that has been conducted to the partition 116 can be conducted efficiently to the heat-radiating fin 108.

Since the partition 116 is provided in the present embodiment, the opening between the isolation wall 112d and the partition 112e is required at least to have a waterproof property. In the present embodiment, the waterproof property is ensured by butting the isolation wall 112d and the partition 116, and butting the partitions 112e and 116, via the sealant 117.

Since a thermal insulating material is used in general for the sealant 117, the heat that has been conducted to the partition 116 via the heat pipe 106 can be suppressed from being conducted to the isolation wall 112a and/or 112d.

In this case, it is preferable that the casing of the PC 1 is formed of the isolation walls 112a, 112c, 112c and 112d, since the heat generated by the CPU 104 will not be conducted easily.

The sealant 117 can be eliminated in a case where the isolation walls 112a, 112b, 112c, 112d, the partitions 112e and 116 are formed integrally (for example, shaped similarly). When the sealant 117 is eliminated, it is possible to improve for example the resistance of the first cabinet 112 against the drop impact.

The cooling operation of the main unit 3 as shown in FIG. 4 will be described below.

The heat generated by the CPU 104 is conducted to the heat pipe 106 via the thermoconductive sheet 105. The heat conducted to the heat pipe 106 is conducted further to the partition 116. Since the heat pipe 106 is connected thermally to one surface of the partition 116 and the heat-radiating fin 108 is connected thermally to the other surface, the heat generated by the CPU 104 is conducted to the heat-radiating fin 108.

Since the heat-radiating fin 108 is arranged in the ventilation path formed by the cooling fan 109 from the intake port 110 to the exhaust port 111, when the cooling fan 109 operates and an airflow from the intake port 110 to the exhaust port 111 is generated, the heat is removed for cooling. As a result, a temperature gradient is formed in the order of the CPU 104, the heat pipe 106, the partition 116 and the heat-radiating fin 108, and thus the cooling efficiency is kept high constantly.

Further, since the first chamber 101 is a sealed space enclosed by the first cabinet 112 and the partition 116, there is an extremely low possibility that external liquids or the like enters. Even if the PC 1 is used in an adverse environment such as during a rainfall, a liquid such as raindrops will enter only the second chamber 102 but hardly enters the first chamber 101. As a result, there is an extremely low possibility that the liquid adheres to various electronic components such as the CPU 104 arranged in the first chamber 101, and thus damage to the electronic components can be prevented.

Further, since the cooling fan 109 is arranged in the second chamber 102 independent from the first chamber 101, there is an extremely low possibility that foreign matters mixed in the cooling air sucked from the intake port 110 enter the first chamber 101. As a result, there is an extremely low possibility that the foreign matters adhere to the various electronic components such as the CPU 104, and damage to the electronic components can be prevented.

Further, since the heat pipe 106 and the partition 116 are joined to each other with a screw or the like, the mechanical fitting strength is high. Therefore, even when the PC 1 is subjected to an impact caused by dropping or the like, there is a low possibility of the heat-radiating path from the CPU 104 to the partition 116 being ruptured.

Further, since a fragile member such as a sealant is not interposed in the heat-radiating path from the CPU 104 to the partition 116 in the present embodiment, degradation in the waterproof property and/or the dustproof property over time is reduced.

Here, since the partition 116 is butt-joined to the isolation wall 112d and to the partition 112e, the mechanical strength against drop impact that may be applied to the PC 1 is high. A joint structure between the partition 116 and the isolation wall 112d and between the partition 116 and the partition 112e is provided by for example, forming convexes on the surfaces of the partition 116 facing the isolation wall 112d and the partition 112e, forming concaves on the surfaces of the isolation wall 112d and the partition 112e each facing the partition 116, and fitting the convexes and the concaves each other.

(Embodiment 4)

Figure 5:
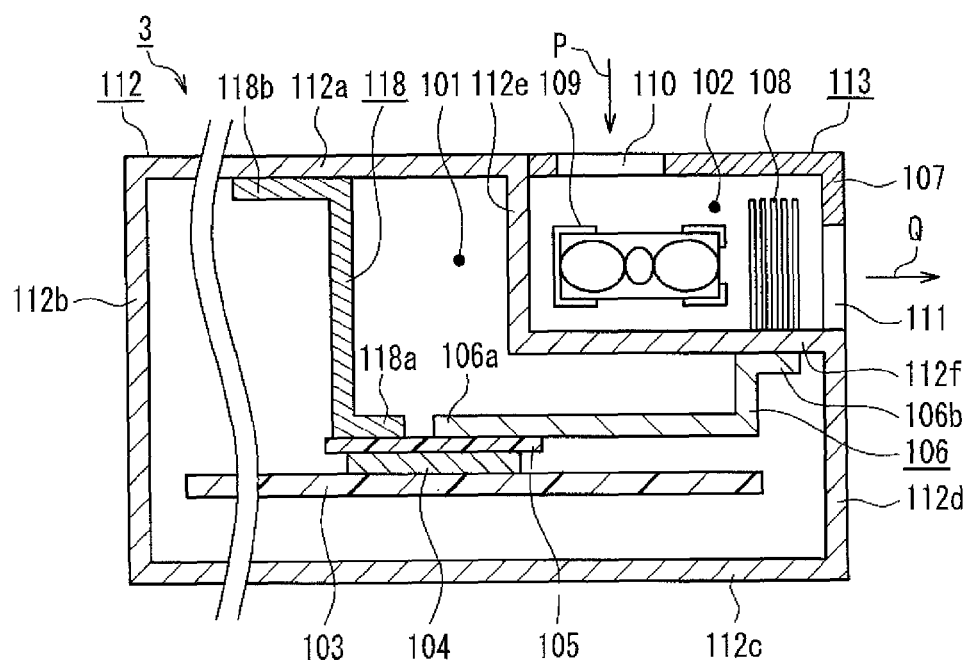
FIG. 5 is a cross-sectional view showing a notebook personal computer according to Embodiment 4.

FIG. 5 is a cross-sectional view showing a cooling structure according to Embodiment 4, taken along the line Z-Z in FIG. 1 for showing the vicinity of the exhaust port 3f and the intake port 3h. In FIG. 5, components similar to those in FIG. 2 are assigned with common marks to avoid duplicated explanation.

A main unit 3 as shown in FIG. 5 is distinguished from the electronic apparatus as shown in FIG. 2 in that &sub-heat pipe 118 is provided further. One end part 118a of the sub-heat pipe 118 is connected thermally to the CPU 104 via the thermoconductive sheet 105. It is preferred that the end part 118a is made to be in surface-contact with the CPU 104 in order to conduct efficiently the heat from the CPU 104. The other end part 118b of the sub-heat pipe 118 is connected thermally to the inner surface of the isolation wall 112a. For the connection between the sub-heat pipe 118 and the isolation wall 112a, any coupling means such as biasing, screwing, brazing or welding can be used individually or in combination. It is also effective to fill the interface between the sub-heat pipe 118 and the isolation wall 112a with for example thermoconductive silicone grease or the like. In the present embodiment, the interface between the sub-heat pipe 118 and the isolation wall 112a is filled with silicone grease and then both the components are joined by screwing and fixed to each other. It is preferable that the other end part 118b is surface-contacted with the isolation wall 112a so that the heat that has been conducted to the sub-heat pipe 118 is conducted to the isolation wall 112a efficiently.

The sub-heat pipe 118 is a hollow pipe into which a liquid such as water has been injected. Preferably the sub-heat pipe 118 is formed of a high thermoconductive metallic material such as copper, aluminum, magnesium and the like, or a composite material prepared by filling a polyamide resin or a silicone polymer with high thermoconductive material such as carbon fibers, aluminum oxide, metallic aluminum or the like. In the present embodiment, the sub-heat pipe 118 is formed of metallic copper.

The cooling operation of the main unit 3 as shown in FIG. 5 will be described below.

The heat generated by the CPU 104 is conducted to the heat pipe 106 and to the sub-heat pipe 118 via the thermoconductive sheet 105.

The heat conducted to the heat pipe 106 is conducted further to the partition 112f. Since the heat pipe 106 is connected thermally to one surface of the partition 112f and the heat-radiating fin 108 is connected thermally to the other surface, the heat generated by the CPU 104 is conducted to the heat-radiating fin 108.

Since the heat-radiating fin 108 is arranged in the ventilation path formed by the cooling fan 109 from the intake port 110 to the exhaust port 111, efficient cooling can be achieved. As a result, a temperature gradient is formed in the order of the CPU 104, the heat pipe 106, the partition 112f and the heat-radiating fin 108, and thus the cooling efficiency can be set high constantly.

Further, the first chamber 101 is a sealed space. Therefore, even if the PC 1 is used in an adverse environment such as during a rainfall, a liquid such as moisture will enter only the second chamber 102 via the intake port 110 or the exhaust port 111 but hardly enters the first chamber 101. As a result, there is an extremely low possibility that the liquid contacts with the electric components such as the CPU 104 arranged in the first chamber 101, and damage to the electric components can be prevented.

Further, since the cooling fan 109 is arranged in the second chamber 102 independent from the first chamber 101 where the CPU 104 and electronic circuits such as the circuit board 103 are arranged, there is a very low possibility of damage caused by adherence of foreign matters mixed in the cooling air drawn through the intake port 110.

Further, since the heat pipe 106 and the partition 112f are joined to each other by screwing, there is s low possibility of the heat-radiating path from the CPU 104 to the partition 112f being ruptured even if the PC 1 is subjected to a drop impact or the like. Further, since a fragile member such as a sealant is not interposed in the heat-radiating path from the CPU 104 to the partition 116, degradation in the waterproof property and/or the dustproof property over time is suppressed.

The heat conducted to the sub-heat pipe 118 is conducted to the isolation wall 112a. The heat conducted to the isolation wall 112a is radiated toward the interior and the exterior of the first chamber 101. Thereby, the isolation wall 112a is cooled.

Since the isolation wall 112a is a part of the first cabinet 112, the heat conducted to the isolation wall 112a is conducted also to the isolation wall 112b, the isolation wall 112c, the isolation wall 112d, the partition 112e, and the partition 112f. The first cabinet 112 with a large thermal capacity acts as a heat sink. As a result, a temperature gradient is formed in the order of the CPU 104, the sub-heat pipe 118 and the isolation wall 112a, and thus the CPU 104 can be cooled efficiently.

Since the sub-heat pipe 118 is arranged inside the sealed first cabinet 112, the waterproof property and the dustproof property are ensured. Therefore, according to the present embodiment, a cooling structure with ensured waterproof property and dustproof property can be provided.

In the present embodiment, since two types of heat-radiating paths, namely, a heat-radiating path via the heat pipe 106 and a heat-radiating path via the sub-heat pipe 118 are provided, the efficiency of radiating heat generated by the CPU 104 can be improved.

Further, since the two types of heat-radiating paths are provided, a structure for controlling the operation of the cooling fan 108 in accordance with the operation condition of the CPU 104 can be provided. For example, the CPU 104 is driven at a low speed and generates less heat when the operating rate of the equipment under the control is low. In such a case, it is preferable that the cooling fan 109 is not operated but heat radiation is carried out only through thermal conduction by the heat pipe 106 and the sub-heat pipe 118. On the other hand, the CPU 104 is driven at a high speed and generates more heat when the operating rate of the equipment under the control is high. In such a case, in addition to heat radiation by the heat pipe 106 and the sub-heat pipe 118, a control is carried out to operate the cooling fan 109 so as to raise the efficiency of radiating heat generated by the CPU 104.

In the present embodiment, the heat pipe 106 and the sub-heat pipe 118 are connected thermally to the CPU 104. Alternatively, the heat pipe 106 and the sub-heat pipe 118 may be connected thermally to different electric components (heat sources) separately.

Further, in the present embodiment, the sub-heat pipe 118 is connected thermally to the isolation wall 112a. Alternatively, the sub-heat pipe 118 may be connected thermally to any of the isolation wall 112b, the isolation wall 112c, the isolation wall 112d and the partition 112e.

(Embodiment 5)

Figure 6:
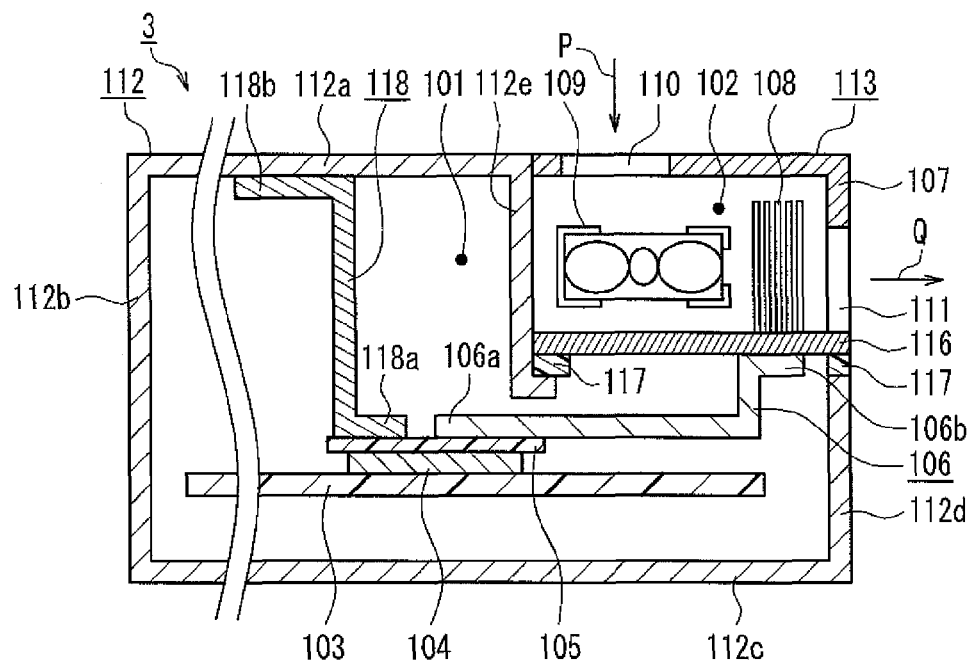
FIG. 6 is a cross-sectional view showing a notebook personal computer according to Embodiment 5.

FIG. 6 is a cross-sectional view showing a cooling structure according to Embodiment 5, taken along the line Z-Z in FIG. 1 for showing the vicinity of the exhaust port 3f and the intake port 3h. In FIG. 6, components similar to those in FIG. 4 are assigned with common marks to avoid duplicated explanation.

The electronic apparatus as shown in FIG. 6 is configured by further including a sub-heat pipe 118 in the electronic apparatus as shown in FIG. 4. As the sub-heat pipe 118 has a configuration similar to that of the sub-heat pipe 118 as shown in FIG. 5, duplicated explanation will be avoided.

As shown in FIG. 6, one end part 106a of the heat pipe 106 is connected thermally to the CPU 104 via a thermoconductive sheet 105, and other end part 106b is connected thermally to the partition 116. For the connection between the heat pipe 106 and the partition 116, any coupling system such as biasing, screwing, brazing or welding can be used individually or in combination. It is also effective to fill the interface between the heat pipe 106 and the partition 116 with for example thermoconductive silicone grease or the like. In the present embodiment, the interface between the heat pipe 106 and the partition 116 is filled with silicone grease and then the components are joined by screwing and fixed to each other.

One end part 118a of the sub-heat pipe 118 is connected thermally to the CPU 104 via the thermoconductive sheet 105 and the other end part 118b is connected thermally to the isolation wall 112a. For the connection between the sub-heat pipe 118 and the isolation wall 112a, any coupling system such as biasing, screwing, brazing or welding can be used individually or in combination. It is also effective to fill the interface between the sub-heat pipe 118 and the isolation wall 112a with for example thermoconductive silicone grease or the like. In the present embodiment, the interface between the sub-heat pipe 118 and the isolation wall 112a is filled with silicone grease and then the components are joined by screwing and fixed to each other.

The cooling operation of the main unit 3 as shown in FIG. 6 will be described below.

The heat generated by the CPU 104 is conducted to the heat pipe 106 and to the sub-heat pipe 118 via the thermoconductive sheet 105.

The heat conducted to the heat pipe 106 is conducted further to the partition 116. Since the heat pipe 106 is connected thermally to one surface of the partition 116 and the heat-radiating fin 108 is connected thermally to the other surface, the heat generated by the CPU 104 is conducted to the heat-radiating fin 108.

Since the heat-radiating fin 108 is arranged in the ventilation path formed by the cooling fan 109 from the intake port 110 to the exhaust port 111, efficient cooling can be achieved. As a result, a temperature gradient is formed in the order of the CPU 104, the heat pipe 106, the partition 116 and the heat-radiating fin 108, and thus the efficiency for removing the heat generated by the CPU 104 can be set high constantly.

Further, the first chamber 101 is a sealed space. Therefore, even when the PC 1 is used in an adverse environment such as during a rainfall, a liquid such as moisture will enter only the second chamber 102 via the intake port 110 or the exhaust port 111 but hardly enters the first chamber 101. As a result, there is an extremely low possibility that the liquid contacts with the electric components such as the CPU 104 arranged in the first chamber 101, and damage to the electric components can be prevented.

Further, since the cooling fan 109 is arranged in the second chamber 102 independent from the first chamber 101 where the CPU 104 and electronic circuits such as the circuit board 103 are arranged, there is a low possibility of damage caused by adherence of foreign matters mixed in the cooling air sucked from the intake port 110.

Further, since the heat pipe 106 and the partition 116 are joined to each other by screwing, there is a low possibility of the heat-radiating path from the CPU 104 to the partition 116 being ruptured even if the PC 1 is subjected to a drop impact or the like. Further, since a fragile member such as a sealant is not interposed in the heat-radiating path from the CPU 104 to the partition 116, degradation in the waterproof property and/or the dustproof property over time is reduced.

The heat conducted to the sub-heat pipe 118 is conducted to the isolation wall 112a. The heat conducted to the isolation wall 112a is radiated toward the interior and the exterior of the first chamber 101. Thereby, the isolation wall 112a is cooled.

Since the isolation wall 112a is a part of the first cabinet 112, the heat conducted to the isolation wall 112a is conducted also to the isolation wall 112b, the isolation wall 112c, the isolation wall 112d, the partition 112e, and the partition 112f. The first cabinet 112 with a large heat capacity acts as a heat sink. As a result, a temperature gradient is formed in the order of the CPU 104, the sub-heat pipe 118 and the isolation wall 112a, and thus the CPU 104 can be cooled efficiently.

Since the sub-heat pipe 118 is arranged inside the sealed first cabinet 112, the waterproof property and the dustproof property are ensured. Therefore, according to the present embodiment, a cooling structure with ensured waterproof property and dustproof property can be provided.

In the present embodiment, since two types of heat-radiating paths, namely, a heat-radiating path via the heat pipe 106 and a heat-radiating path via the sub-heat pipe 118 are provided, the efficiency of radiating heat generated by the CPU 104 can be improved.

Further, since the two types of heat-radiating paths are provided, a structure for controlling the operation of the cooling fan 109 in accordance with the operation condition of the CPU 104 can be provided. For example, the CPU 104 is driven at a low speed and generates less heat when the operating rate of the equipment under the control is low. In such a case, it is preferable that the cooling fan 109 is not operated but heat radiation is carried out only through thermal conduction by the heat pipe 106 and the sub-heat pipe 118.

Since a typical sealant 117 made of a thermal insulating material functions also to isolate thermally the isolation wall 112a, 112d from the partition 116. In this configuration therefore, a function of shielding the heat conducted to the partition 116 via the heat pipe 106 and the heat conducted to the isolation wall 112a via the sub-heat pipe 118 can be provided.

On the other hand, the CPU 104 is driven at a high speed and generates more heat when the operating rate of the equipment under the control is high. In such a case, in addition to heat radiation by the heat pipe 106 and the sub-heat pipe 118, a control is carried out to operate the cooling fan 109 so as to raise the efficiency of radiating heat generated by the CPU 104.

In the present embodiment, the heat pipe 106 and the sub-heat pipe 118 are connected thermally to the CPU 104. Alternatively, the heat pipe 106 and the sub-heat pipe 118 may be connected thermally to different electric components (heat sources) separately.

Further, in the present embodiment, the sub-heat pipe 118 is connected thermally to the isolation wall 112a. Alternatively, the sub-heat pipe 118 may be connected thermally to any of the isolation wall 112b, the isolation wall 112c, the isolation wall 112d and the partition 112e.

The sealant 117 can be eliminated in a case where the isolation walls 112a, 112b, 112c, 112d and the partitions 112e, 116 are formed integrally (for example, shaped simultaneously). By eliminating the sealant 117, for example, it is possible to improve the resistance of the first cabinet 112 against drop impact.

(Embodiment 6)

Figure 7:
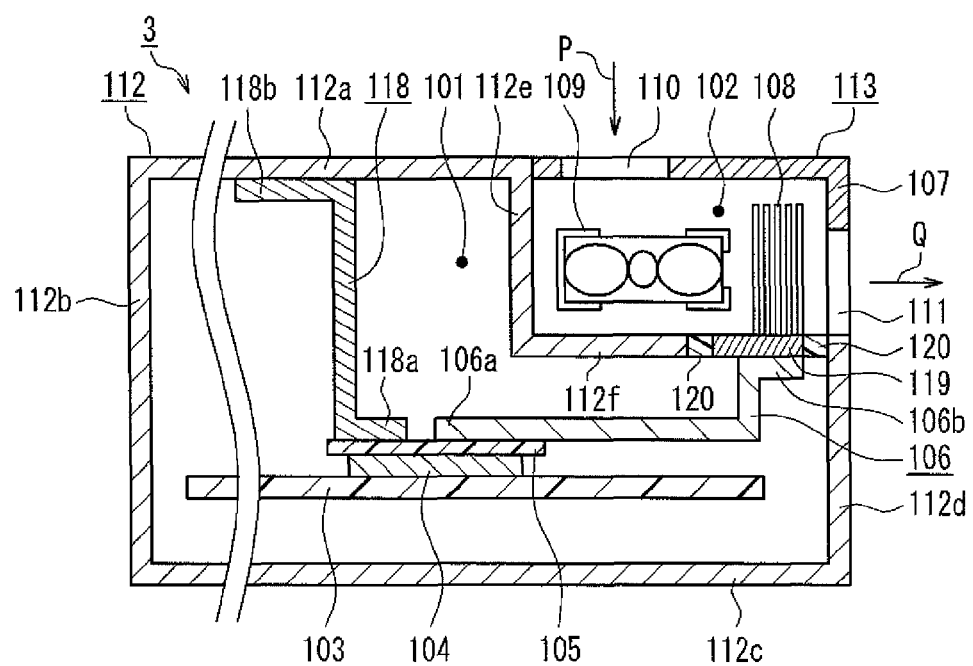
FIG. 7 is a cross-sectional view showing a notebook personal computer according to Embodiment 6.

FIG. 7 is a cross-sectional view showing a cooling structure according to Embodiment 6, taken along the line Z-Z in FIG. 1 for showing the vicinity of the exhaust port 3f and the intake port 3h. In FIG. 7, components similar to those in FIG. 5 are assigned with common marks to avoid duplicated explanation.

The configuration as shown in FIG. 7 is distinguished from the configuration as shown in FIG. 5 in that a partition 119 and a sealant 120 are provided.

One end part 106b of the heat pipe 106 is connected thermally to the partition 119. The sealant 120 is arranged between the isolation wall 112d and the partition 119, and between the partition 112f and the partition 119. The partition 119 is made of a material having high thermal conductivity and/or low thermal capacity. For the connection between the heat pipe 106 and the partition 119, any coupling means such as biasing, screwing, brazing or welding can be used individually or in combination. It is also effective to fill the interface between the heat pipe 106 and the partition 119 with for example thermoconductive silicone grease or the like. In the present embodiment, the interface between the heat pipe 106 and the partition 119 is filled with silicone grease and then the components are joined by screwing and fixed to each other.

It is preferable that the partition 119 is configured to have a thermal conductivity equal to or higher than those of the other partitions 112e and 112f, and the isolation walls 112a, 112b, 112c, 112d. The thermal conductivity can be improved remarkably by, for example, making the partition 119 to be thinner than the isolation wall 112a, the isolation wall 112b, the isolation wall 112c, the isolation wall 112d, the partition 112e and the partition 112f (the substantial thickness of the partition 112f in the present embodiment). Further, it is preferable that the partition 119 is made of a material having a thermal conductivity equal to or higher than the thermal conductivity of the material used for the partition 112f. Examples of preferred materials for the partition 119 include a high thermoconductive metallic material such as copper, aluminum, magnesium and the like, an inorganic material such as graphite, and a composite material prepared by filling a polyamide resin or a silicone polymer with a high thermoconductive material such as carbon fibers, aluminum oxide, and metallic aluminum. In the present embodiment, the partition 119 was formed of graphite.

However, for example, in a case where the isolation wall 112a, the isolation wall 112b, the isolation wall 112c, the isolation wall 112d, the partition 112e and the partition 112f are formed of a material such as an organic polymer resin having inferior thermal conductivity, the heat conducted to the heat pipe 106 hardly is conducted to the isolation wall 112a, the isolation wall 112b, the isolation wall 112c, the isolation wall 112d, the partition 112e and the partition 112f but easily conducted to the partition 119. Therefore, it is possible to conduct heat effectively to the heat-radiating fin 108.

The interfaces between the isolation wall 112d and the partition 119, and between the partition 112f and the partition 119 are required to be at least waterproof. In the present embodiment, a sealant 120 is arranged on the interfaces between the isolation wall 112d and the partition 119 and between the partition 112f and the partition 119. Furthermore in the present embodiment, the isolation wall 112d, and the partition 112f are butt-joined to the partition 119 so as to ensure the waterproof property.

One end part 106a of the heat pipe 106 is connected thermally to the CPU 104 via a thermoconductive sheet 105, and the other end part 106b is connected thermally to the partition 119. For the connection between the heat pipe 106 and the partition 116, any coupling system such as biasing, screwing, brazing or welding can be used individually or in combination. It is also effective to fill the interface between the heat pipe 106 and the partition 119 with for example thermoconductive silicone grease or the like. In the present embodiment, the interface between the heat pipe 106 and the partition 119 is filled with silicone grease and then the components are joined by screwing and fixed to each other.

One end part 118a of the sub-heat pipe 118 is connected thermally to the CPU 104 via the thermoconductive sheet 105 and the other end part 118b is connected thermally to the isolation wall 112a. For the connection between the sub-heat pipe 118 and the isolation wall 112a, any coupling system such as biasing, screwing, brazing or welding can be used individually or in combination. It is also effective to fill the interface between the sub-heat pipe 118 and the isolation wall 112a with for example thermoconductive silicone grease or the like. In the present embodiment, the interface between the sub-heat pipe 118 and the isolation wall 112a is filled with silicone grease and then the components are joined by screwing and fixed to each other.

The cooling operation of the main unit 3 as shown in FIG. 7 will be described below.

The heat generated by the CPU 104 is conducted to the heat pipe 106 and to the sub-heat pipe 118 via the thermoconductive sheet 105.

The heat conducted to the heat pipe 106 is conducted further to the partition 119. Since the heat pipe 106 is connected thermally to one surface of the partition 119 and a heat-radiating fin 108 is connected thermally to the other surface, the heat generated by the CPU 104 is conducted to the heat-radiating fin 108.

Since the heat-radiating fin 108 is arranged in the ventilation path formed by the cooling fan 109 from the intake port 110 to the exhaust port 111, efficient cooling can be achieved. As a result, a temperature gradient is formed in the order of the CPU 104, the heat pipe 106, the partition 119 and the heat-radiating fin 108, and thus the cooling efficiency can be set high constantly.

Further, the first chamber 101 is a sealed space. Therefore, even when the PC 1 is used in adverse environments such as during a rainfall, a liquid such as moisture will enter only the second chamber 102 via the intake port 110 or the exhaust port 111, but hardly enters the first chamber 101. As a result, there is an extremely low possibility that the liquid contacts with the electric components such as the CPU 104 arranged in the first chamber 101, and damage to the electric components can be prevented.

Further, since the cooling fan 109 is arranged in the second chamber 102 independent from the first chamber 101 where the CPU 104 and electronic circuits such as the circuit board 103 are arranged, there is a low possibility of damage caused by adherence of foreign matters mixed in the cooling air drawn through the intake port 110.

Further, since the heat pipe 106 and the partition 119 are joined to each other by screwing, there is a low possibility of the heat-radiating path from the CPU 104 to the partition 119 being ruptured even if the PC 1 is applied with drop impact or the like. Further, since a fragile member such as a sealant is not interposed in the heat-radiating path from the CPU 104 to the partition 119, degradation in the waterproof property and/or the dustproof property over time is suppressed.

The heat conducted to the sub-heat pipe 118 is conducted to the isolation wall 112a. The heat conducted to the isolation wall 112a is radiated toward the interior and the exterior of the first chamber 101. Thereby, the isolation wall 112a is cooled.

Since the isolation wall 112a is a part of the first cabinet 112, the heat conducted to the isolation wall 112a is conducted also to the isolation wall 112b, the isolation wall 112c, the isolation wall 112d, the partition 112e, and the partition 112f. The first cabinet 112 with a large thermal capacity acts as a heat sink. As a result, a temperature gradient is formed in the order of the CPU 104, the sub-heat pipe 118 and the isolation wall 112a, and thus the CPU 104 can be cooled efficiently.

Since the sub-heat pipe 118 is arranged inside the sealed first cabinet 112, the waterproof property and the dustproof property are ensured. Therefore, according to the present embodiment, a cooling structure with ensured waterproof property and dustproof property can be provided.

In the present embodiment, since two types of heat-radiating paths, namely, a heat-radiating path via the heat pipe 106 and a heat-radiating path via the sub-heat pipe 118 are provided, the efficiency of radiating heat generated by the CPU 104 can be improved.

Further, since the two types of heat-radiating paths are provided, a structure for controlling the operation of the cooling fan 108 in accordance with the operation condition of the CPU 104 can be provided. For example, the CPU 104 is driven at a low speed and generates less heat when the operating rate of the equipment under the control is low. In such a case, it is preferable that the cooling fan 109 is not operated but heat radiation is carried out only through thermal conduction by the heat pipe 106 and the sub-heat pipe 118.

A typical sealant 120 made of a thermal insulating material functions also to isolate thermally the isolation walls 112a and 112d from the partition 119. In this configuration therefore, a function of shielding the heat conducted to the partition 119 via the heat pipe 106 and the heat conducted to the isolation wall 112a via the sub-heat pipe 118 is provided.

On the other hand, the CPU 104 is driven at a high speed and generates more heat when the operating rate of the equipment under the control is high. In such a case, in addition to heat radiation by the heat pipe 106 and the sub-heat pipe 118, a control is carried out to operate the cooling fan 109 so as to raise the efficiency of radiating heat generated by the CPU 104.

In the present embodiment, the heat pipe 106 and the sub-heat pipe 118 are connected thermally to the CPU 104. Alternatively, the heat pipe 106 and the sub-heat pipe 118 may be connected thermally to different electric components (heat sources) separately.

Further, in the present embodiment, the sub-heat pipe 118 is connected thermally to the isolation wall 112a. Alternatively, the sub-heat pipe 118 may be connected thermally to any of the isolation wall 112b, the isolation wall 112c, the isolation wall 112d and the partition 112e.

The sealant 120 can be eliminated in a case where the isolation walls 112a, 112b, 112c, 112d and the partitions 112e, 119 are formed integrally (for example, shaped simultaneously). By eliminating the sealant 120, for example, it is possible to improve the resistance of the first cabinet 112 against drop impact.

(Embodiment 7)

Figure 8:
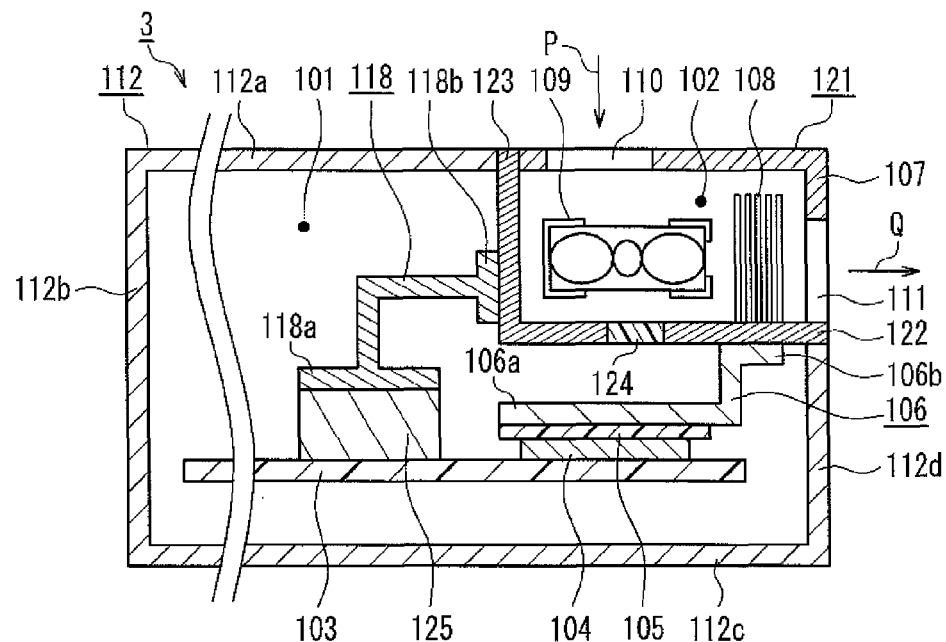
FIG. 8 is a cross-sectional view showing a notebook personal computer according to Embodiment 7.

FIG. 8 is a cross-sectional view showing a cooling structure according to Embodiment 7, taken along the line Z-Z in FIG. 1 for showing the vicinity of the exhaust port 3f and the intake port 3h. In FIG. 8, components similar to those in FIG. 3 are assigned with common marks to avoid duplicated explanation.

The configuration as shown in FIG. 8 is distinguished from the configuration as shown in FIG. 3 in that the sub-heat pipe 118, partitions 121, 122, 123, a heat insulator 124 and a hard disk drive (HDD) 125 are provided. As the configuration of the sub-heat pipe 118 has been explained in Embodiment 4, duplicated explanation is avoided in the present embodiment.

The partitions 122 and 123 divide spatially the first chamber 101 and the second chamber 102. The partitions 122 and 123 are formed of a high thermoconductive material and/or a low thermal capacity material that is different from the material used for the isolation walls 112a, 112b, 112c and 112d, so that the thermal characteristics can be changed.

The thermal insulator 124 is arranged between the partition 122 and the partition 123. The thermal insulator 124 divides thermally the partition 122 and the partition 123 in order to hinder thermal conduction from the partition 122 to the partition 123, and from the partition 123 to the partition 122.

One end part 106a of the heat pipe 106 is connected thermally to the CPU 104, and the other end part 106b is connected thermally to a partition that separates the first chamber 101 and the second chamber 102 (the partition 122 in the present embodiment). For the connection between the heat pipe 106 and the partition, 122, any coupling system such as biasing, screwing, brazing or welding can be used individually or in combination. It is also effective to fill the interface between the heat pipe 106 and the partition 122 with for example thermoconductive silicone grease or the like. In the present embodiment, the interface between the heat pipe 106 and the partition 122 is filled with silicone grease and then the components are joined by screwing and fixed to each other.

It is preferable that the partition 122 is made thinner than the isolation wall 112d or the like, so that the thermal capacity and/or the thermal resistance can be lowered. In the present embodiment, the first cabinet 112 has a preferable thermal conductivity as it is formed of metallic magnesium. However, in a case where a material such as an organic polymer resin inferior in thermal conductivity is applied to the isolation wall 112d or the like, it is preferable that at least a part of the partition 122 to be thermally connected to the heat pipe 106 is formed of the substantially same material as the thermoconductive sheet 105. In a case where the first cabinet 112 is formed of a plurality of materials, the materials are fixed to each other by for example adhesion or heat seal so as to ensure the waterproof property and the dustproof property of the first cabinet 112.

The HDD 125 is mounted on a circuit board 103. The HDD 125 includes a magnetic disk that can record information, a magnetic head that can write information on the magnetic disk and read information that has been written on the magnetic disk, a motor that rotates the magnetic disk at high speed, and the like. It is preferable that the HDD 125 and the sub-heat pipe 118 are surface-contacted to each other in order to conduct efficiently the heat generated by the HDD 125 to the sub-heat pipe 118. In the present embodiment, the HDD 125 and one end part 118a of the sub-heat pipe 118 are surface-contacted with each other over area as large as possible. It is preferable that a thermoconductive sheet 105 is interposed between the HDD 125 and the end part 118a of the sub-heat pipe 118.

As shown in FIG. 8, one end part 118a of the sub-heat pipe 118 is connected thermally to the HDD 125 and the other end part 118b is connected thermally to the partition 123. For the connection between the sub-heat pipe 118 and the partition 123, any coupling system such as biasing, screwing, brazing or welding can be used individually or in combination. It is also effective to fill the interface between the sub-heat pipe 118 and the partition 123 with for example thermoconductive silicone grease or the like. In the present embodiment, the interface between the sub-heat pipe 118 and the partition 123 is filled with silicone grease and then the components are joined by screwing and fixed to each other.

It is preferable that the partition 123 is made thinner than the isolation wall 112a or the like so that the thermal capacity and/or the thermal resistance can be lowered. In the present embodiment, the first cabinet 112 has a preferable thermal conductivity as it is formed of metallic magnesium. However, in a case where a material such as an organic polymer resin inferior in thermal conductivity is applied to the first cabinet 112, it is preferable that at least a part of the partition 123 to be thermally connected to the sub-heat. pipe 118 is formed of the same material as the thermoconductive sheet 105. In a case where the first cabinet 112 is formed of a plurality of materials, the materials are fixed to each other by for example adhesion or heat seal, so that a waterproof property and a dustproof property of the first cabinet 112 can be ensured.

The HDD 125 operates according to the command of the CPU 104. When an operation command from the CPU 104 is sent to the HDD 125, the motor acts for rotating the magnetic disk at high speed and generates heat. The heat generated by the HDD 125 is conducted to the partition 123 via the sub-heat pipe 118. The CPU 104 operates steadily while the PC 1 is in an active state, and generates heat as a result of the operation. The heat generated by the CPU 104 is conducted to the partition 122 via the heat pipe 106. In general, the CPU 104 generates more heat than the HDD 125.

In a case of configuration for conducting the heat generated by the CPU 104 and the heat generated by the HDD 125 to one partition via the heat pipe, for example, the heat generated by the CPU 104 could be conducted toward the HDD 125 via the heat pipe 106, the partition, and the sub-heat pipe 118. In such a case, if the HDD 125 is in a stopped state for example, the heat radiation efficiency of the CPU 104 might be improved further due to the thermal conduction. However, if the HDD 125 generates heat in its active state, the heat radiation path in the sub-heat pipe 118 would be backwards to considerably degrade the heat radiation efficiency at the HDD 125. For suppressing the thermal backflow phenomenon, in the present embodiment, the heat generated by the CPU 104 is conducted to the partition 122 via the heat pipe 106, and the heat generated by the HDD 125 is conducted to the partition 123 via the sub-heat pipe 118. Between the partition 122 and the partition 123, a thermal insulator 124 to thermally divide the partitions is arranged. Due to this configuration, the heat generated by each of the CPU 104 and the HDD 125 can be radiated independently in accordance with the thermal gradient provided to each of the airflow paths.

The thermal insulator 124 can be made of, for example a polymer resin material that shields thermal conduction, and a material such as a graphite sheet that exhibits an obvious uniaxial anisotropy. The thermal insulator 124 is arranged between the partition 122 and the partition 123 as shown in FIG. 8. Alternatively for example, the thermal insulator 124 can be arranged at a position to divide the second chamber 102, for example a position between the partition 122 and the partition 123, a position to enclose the region of the partition 122 to which the heat-radiating fin 108 is joined, and a position to enclose the region of the partition 123 to which the sub-heat pipe 118 is in close contact. The thermal insulator 124 may be configured to have the function of the sealants as explained in Embodiments 4, 5, 7 and 8. The heat conducted to the partition 123 via the sub-heat pipe 118 is removed also by the cooling air from the cooling fan 109.

The cooling operation of the main unit 3 as shown in FIG. 8 will be described below.

After an operation system or an application system executes, any proceedings, the CPU 104 generates heat and the surface temperature rises. The heat generated by the CPU 104 is conducted to the heat pipe 106 via the thermoconductive sheet 105. The heat conducted to the heat pipe 106 is conducted to the partition 122. Since the end part 106b of the heat pipe 106 is connected thermally to one surface of the partition 122 while the heat-radiating fin 108 is connected thermally to the other surface of the partition 122, the heat generated by the CPU 104 is conducted to the heat-radiating fin 108. Since the heat-radiating fin 108 is arranged in the ventilation path formed by the cooling fan 109 from the intake port 110 to the exhaust port 111, efficient cooling can be achieved. As a result, a temperature gradient is formed from the CPU 104 to the heat-radiating fin 108, and thus the cooling efficiency can be set high constantly.

The HDD 125 operates according to the command of the CPU 104. When the CPU 104 sends a command for reproducing information for example with respect to the HDD 125, the HDD 125 operates the motor so as to rotate the magnetic disk, and at the same time, operates the magnetic head so as to read out information recorded on the magnetic disk. The information read out from the HDD 125 is sent to the CPU 104. At this time, the HDD 125 generates heat. However, since the HDD 125 generates heat only when receiving a command from the CPU 104, the heat generation is intermittent. Furthermore in general, the HDD 125 generates less heat than the CPU 104.

Therefore, as the heat generation at the HDD 125 is intermittent and the amount of heat generation is small, the heat that has been conducted from the CPU 104 to the partition 122 via the heat pipe 106 could be conducted from the partition 122 to the partition 123, and the thus conducted heat could be conducted to the HDD 125 via the sub-heat pipe 118. However, since the thermal insulator 124 that shields heat is interposed between the partition 122 and the partition 123, it is possible to provide independently a thermoconductive path that joins the CPU 104, the heat pipe 106 and the partition 122, and a thermoconductive path that joins the HDD 125, the sub-heat pipe 118 and the partition 123. Therefore, it is possible to suppress the heat backflow phenomenon and to improve the efficiency in radiating heat generated by the CPU 104 and the HDD 125.

In the present embodiment, a heat-generating member such as the CPU 104, which generates the largest amount of heat and generates heat constantly, is configured to conduct heat directly to the partition 122. In some cases, it is even more effective that a heat-generating member that generates the largest amount of heat steadily is configured to penetrate the partition 122 so as to join thermally the heat pipe 106 and the heat-radiating fin 108 as disclosed in JP 2006-019384 for example. In such a configuration, the partition 122 is not necessarily required to be an excellent thermal conductor. Alternatively, it can be made of the material of the thermal insulator 124. It should be noted however, that the waterproof property and the dustproof property between the partition 122 or the thermal insulator 124 and the heat pipe 106 must be ensured.

Examples of heat-generating members stated in the present embodiment are the CPU 104 and the HDD 125. Alternatively, they can be applied to, for example, an optical disk drive, a built-in device such as a backlight for the display panel 2a, and an internal electronic circuit like an inverter circuit that controls the backlight.

In the present embodiment, one heat pipe 106 and one sub-heat pipe 118 are provided. Alternatively, another heat pipe for thermally joining to the isolation wall 112d, the isolation wall 112a or the like can be provided. Namely, the number of the heat-radiating members and/or the number of the heat pipes to be included in the PC 1 can be increased appropriately in accordance with the design of the PC 1. In a case of employing a configuration to intensively radiate heat toward the potential location for thermal engagement (the partitions 122 and 123 in the present embodiment), at least a thermal insulating material for shielding the heat radiating location of the heat-generating member that generates the largest heat (CPU 104 in the present embodiment) is interposed to suppress such a thermal backflow phenomenon.

In the present embodiment, the PC 1 is stated as an example of electronic apparatus. Alternatively, it can be applied to general electronic apparatuses including heat-generating units, such as an external hard disk drive, a digital video camera, a digital still camera, a projector and a mobile phone.

(Embodiment 8)

Figure 9:
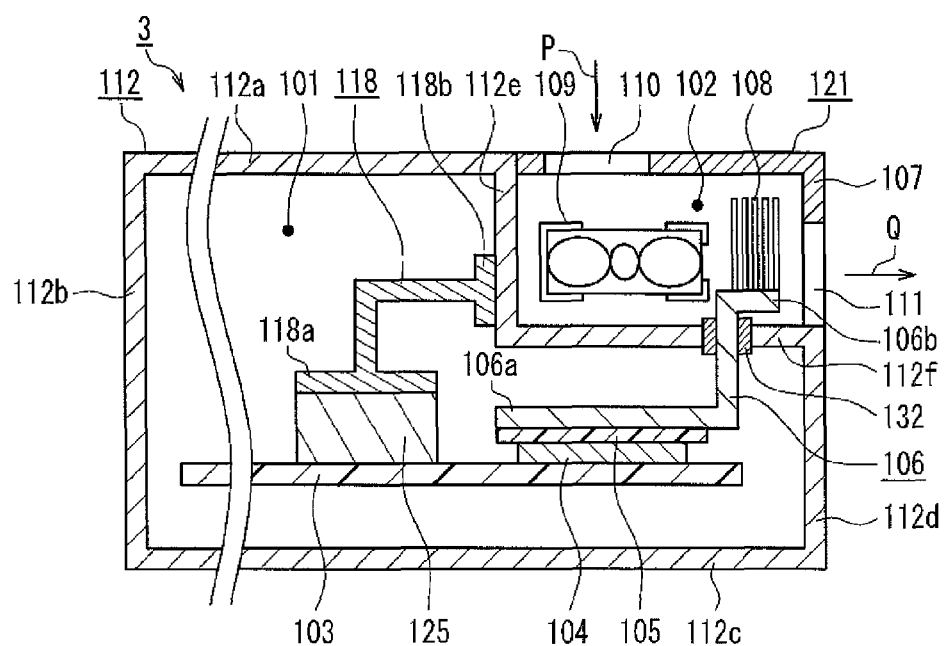
FIG. 9 is a cross-sectional view showing a notebook personal computer according to Embodiment 8.

FIG. 9 is a cross-sectional view showing a cooling structure according to Embodiment 8, taken along the line Z-Z in FIG. 1 for showing the vicinity of the exhaust port 3f and the intake port 3h. In FIG. 9, components similar to those in FIG. 8 are assigned with common marks to avoid duplicated explanation.

The first cabinet 112 and the heat pipe 106 in FIG. 9 are configured differently from those in FIG. 8. The first cabinet 112 as shown in FIG. 9 is formed of the isolation walls 112a, 112b, 112c, 112d and partitions 112e, 112f. In the partition 112f, an open hole is formed. At one end part 106b side, the heat pipe 106 penetrates the open hole formed in the partition 112f. A heat-radiating fin 108 is fixed to the end part 106b of the heat pipe 106. A sealant 132 is interposed between the open hole formed in the partition 112f and the heat pipe 106. The sealant 132 prevents a liquid from entering the first chamber 101 from the second chamber 102.

In a case of a configuration conducting the heat generated by the CPU 104 and the heat generated by the HDD 125 to one partition via the heat pipe, for example, the heat generated by the CPU 104 might be conducted toward the HDD 125 via the heat pipe 106, the partition, and the sub-heat pipe 118. If the HDD 125 is in a stopped state for example, the heat radiation efficiency of the CPU 104 might be improved further due to the thermal conduction. However, if the HDD 125 generates heat in its active state, the heat radiation path in the sub-heat pipe 118 would be backwards to considerably degrade the heat radiation efficiency at the HDD 125. For suppressing the thermal backflow phenomenon, in the present embodiment, the sealant 132 is provided between the heat pipe 106 and the partition 112f so as to thermally divide the heat pipe 106 and the first cabinet 112. Due to this configuration, the heat generated by each of the CPU 104 and the HDD 125 can be radiated independently in accordance with the thermal gradient provided to each of the airflow paths. And, the heat generated by the HDD 125, which is conducted to the partition 112e via the sub-heat pipe 118, can be radiated at the cooling fan 109.

The cooling operation of the main unit 3 as shown in FIG. 9 will be described below.

The heat generated by the CPU 104 is conducted to the heat pipe 106 via the thermoconductive sheet 105. The heat conducted to the heat pipe 106 is conducted to the heat-radiating fin 108. As the heat-radiating fin 108 is arranged in the ventilation path formed by the cooling fan 109 from the intake port 110 to the exhaust port 111 as indicated with arrows P and Q, efficient cooling can be achieved. Therefore, a temperature gradient is formed in the order of the CPU 104, the heat pipe 106, and the heat-radiating fin 108, and thus the efficiency in removing the heat generated by the CPU 104 can be set high constantly.

Further, the first chamber 101 is a sealed space. Therefore, even when the PC 1 is used in an adverse environment such as during a rainfall, a liquid such as moisture will enter only the second chamber 102 via the intake port 110 or the exhaust port 111 but hardly enters the first chamber 101. As a result, there is an extremely low possibility that the liquid contacts with the electric components such as the CPU 104 arranged in the first chamber 101, and damage to the electric components can be prevented.

Further, since the cooling fan 109 is arranged in the second chamber 102 independent from the first chamber 101 where the CPU 104 and electronic circuits such as the circuit board 103 are arranged, there is a very low possibility of damage caused by adherence of foreign matters mixed in the cooling air sucked from the intake port 110.

The heat conducted from the HDD 125 to the sub-heat pipe 118 is conducted to the partition 112e. The heat conducted to the partition 112e is radiated toward the interior of the first chamber 101 and also toward the interior of the second chamber 102. Thereby, the partition 112e is cooled.

Since the partition 112e is a part of the first cabinet 112, the heat conducted to the partition 112e is conducted also to the isolation wall 112a, the isolation wall 112b, the isolation wall 112c, the isolation wall 112d, and the partition 112f. The first cabinet 112 with a large thermal capacity acts as a heat sink. As a result, a temperature gradient is formed in the order of the HDD 125, the sub-heat pipe 118 and the partition 112e, and thus the HDD 125 can be cooled efficiently.

Here, the partition 112e is a wall that separates the second chamber 102 and the first chamber 101, and thus the cooling fan 109 provided to the second chamber 102 also provides a cooling effect. As a result, with the above-described heat sink effect, the cooling efficiency can be improved.

Furthermore, since the sealant 132 is arranged between the heat pipe 106 and the partition 112f, the heat of the heat pipe 106 is not conducted to the first cabinet 112 that includes the partition 112f. Similarly, the heat conducted from the sub-heat pipe 118 to the first chamber 112 is not conducted to the heat pipe 106.

Since the sub-heat pipe 118 is arranged inside the sealed first cabinet 112, the waterproof property and the dustproof property are ensured. Therefore, according to the present embodiment, a cooling structure with ensured waterproof property and dustproof property can be provided.

Since the first cabinet 112 is formed of the isolation walls 112a, 112b, 112c, 112d and the partitions 112e, 112f in the present embodiment, the mechanical strength against drop impact that may be applied to the PC 1 is high.

The sealant 132 is not limited particularly as long as the heat pipe 106 and the partition 112f are configured watertight. For this purpose, a mechanically hard layer of a waterproof adhesive or silicone-based filler, or a buffer layer having rubber elasticity such as a so-called "bush" can be used. It is particularly preferable to apply a watertight buffer material, since a configuration with excellent resistance against disturbance such as dropping can be provided. In the present embodiment, a silicone rubber buffer was applied.

(Embodiment 9)

Figure 10:
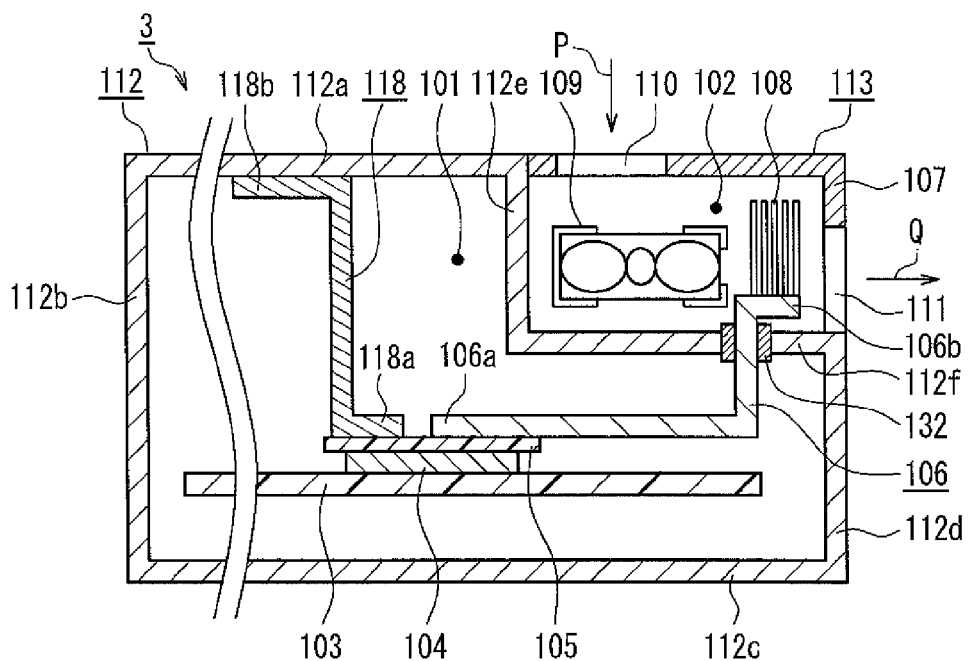
FIG. 10 is a cross-sectional view showing a notebook personal computer according to Embodiment 9.

FIG. 10 is a cross-sectional view showing a cooling structure according to Embodiment 9, taken along the line Z-Z in FIG. 1 for showing the vicinity of the exhaust port 3f and the intake port 3h. In FIG. 10, components similar to those in FIG. 5 are assigned with common marks to avoid duplicated explanation.

The configuration shown in FIG. 10 is distinguished from the configuration shown in FIG. 5 in that an end part 106b of the heat pipe 106 is located in the second chamber 102.

One end part 106a of the heat pipe 106 is connected thermally to the CPU 104. The other end part 106b of the heat pipe 106 penetrates the partition 112f and located inside the second chamber 102. The heat-radiating fin 108 is connected thermally to the end part 106b of the heat pipe 106. The heat pipe 106 and the heat-radiating fin 108 are connected thermally to each other by, for example; integrally forming the heat pipe 106 and the heat-radiating fin 108; implanting respective fins of the heat-radiating fin 108 into the grooves or the like formed on the heat pipe 106; preparing a heat pipe 106 and a heat-radiating fin 108 separately and integrating them by brazing, welding or the like; or, filling the interface between the heat pipe 106 and the heat-radiating fin 108 with thermoconductive silicone grease or the like and joining these components to each other by screwing, biasing or the like. In the present embodiment, the interface between the heat pipe 106 and the heat-radiating fin 108 prepared independently is filled with thermoconductive silicone grease, and then the two components are joined and fixed to each other.

In the present embodiment, the heat pipe 106 penetrates the partition 112f. The second chamber 102 is connected spatially to the exterior via the exhaust port 111. The sealant 132 is arranged between the partition 112f and the heat pipe 106. Therefore, the first chamber 101 has a watertight structure due to the sealant 132 arranged between the open hole of the partition 112f and the heat pipe 106.

The cooling operation of the main unit 3 as shown in FIG. 10 will be described below.

The heat generated by the CPU 104 is conducted to the heat pipe 106 via the thermoconductive sheet 105. The heat conducted to the heat pipe 106 is conducted to the heat-radiating fin 108.

As the heat-radiating fin 108 is arranged in the ventilation path formed by the cooling fan 109 from the intake port 110 to the exhaust port 111 as indicated with arrows P and Q, efficient cooling can be achieved. Therefore, a temperature gradient is formed in the order of the CPU 104, the heat pipe 106, and the heat-radiating fin 108, the efficiency in removing the heat generated by the CPU 104 can be set high constantly.

Further, the first chamber 101 is a sealed space. Therefore, even when the PC 1 is used in an adverse environment such as during a rainfall, a liquid such as moisture will enter only the second chamber 102 via the intake port 110 or the exhaust port 111 but hardly enters the first chamber 101. As a result, there is an extremely low possibility that the liquid contacts with the electric components such as the CPU 104 arranged in the first chamber 101, and damage to the electric components can be prevented.

Further, since the cooling fan 109 is arranged in the second chamber 102 independent from the first chamber 101 where the CPU 104 and electronic circuits such as the circuit board 103 are arranged, there is a very low possibility of damage caused by adherence of foreign matters mixed in the cooling air sucked from the intake port 110.

The heat conducted from the CPU 104 to the sub-heat pipe 118 is conducted to the isolation wall 112a. The heat conducted to the isolation wall 112a is radiated toward the interior and the exterior of the first chamber 101. Thereby, the isolation wall 112a is cooled.

Since the isolation wall 112a is a part of the first cabinet 112, the heat conducted to the isolation wall 112a is conducted also to the isolation wall 112b, the isolation wall 112c, the isolation wall 112d, the partition 112e, and the partition 112f. The first cabinet 112 with a large thermal capacity acts as a heat sink. As a result, a temperature gradient is formed in the order of the CPU 104, the sub-heat pipe 118 and the isolation wall 112a, and thus the CPU 104 can be cooled efficiently.

Since the sub-heat pipe 118 is arranged inside the sealed first cabinet 112, the waterproof property and the dustproof property are ensured. Therefore, according to the present embodiment, a cooling structure with ensured waterproof property and dustproof property can be provided.

In the present embodiment, since two types of heat-radiating paths, namely, a heat-radiating path via the heat pipe 106 and a heat-radiating path via the sub-heat pipe 118 are provided, the efficiency of radiating heat generated by the CPU 104 and at the HDD 125 can be improved.

Further, since the two types of heat-radiating paths are provided, a structure for controlling the operation of the cooling fan 108 in accordance with the operation condition of the CPU 104 can be provided. For example, the CPU 104 is driven at a low speed and generates less heat when the operating rate of the equipment under the control is low. In such a case, it is preferable that the cooling fan 109 is not operated but heat radiation is carried out only through thermal conduction by the heat pipe 106 and the sub-heat pipe 118. On the other hand, the CPU 104 is driven at a high speed and generates more heat when the operating rate of the equipment under the control is high. In such a case, in addition to heat radiation by the heat pipe 106 and the sub-heat pipe 118, a control is carried out to operate the cooling fan 109 so as to raise the efficiency of radiating heat.

Since the first cabinet 112 is formed of the isolation walls 112a, 112b, 112c, 112d and the partitions 112e, 112f in the present embodiment, the mechanical strength against drop impact that may be applied to the PC 1 is high.

In the present embodiment, the heat pipe 106 and the sub-heat pipe 118 are connected thermally to the CPU 104. Alternatively, the heat pipe 106 and the sub-heat pipe 118 may be connected thermally to different electric components (heat sources) separately.

Further, in the present embodiment, the sub-heat pipe 118 is connected thermally to the isolation wall 112a. Alternatively, the sub-heat pipe 118 may be connected thermally to any of the isolation wall 112b, the isolation wall 112c, the isolation wall 112d and the partition 112e.

The sealant 132 is not limited particularly as long as the heat pipe 106 and the partition 112f are configured watertight. For this purpose, a mechanically hard layer of a waterproof adhesive or silicone-based filler, or a buffer layer having rubber elasticity such as a so-called "bush" can be used. It is particularly preferable to apply a watertight buffer material, since a configuration with excellent resistance against disturbance such as dropping can be provided. In the present embodiment, a silicone rubber buffer was applied.

(Embodiment 10)

Figure 11:
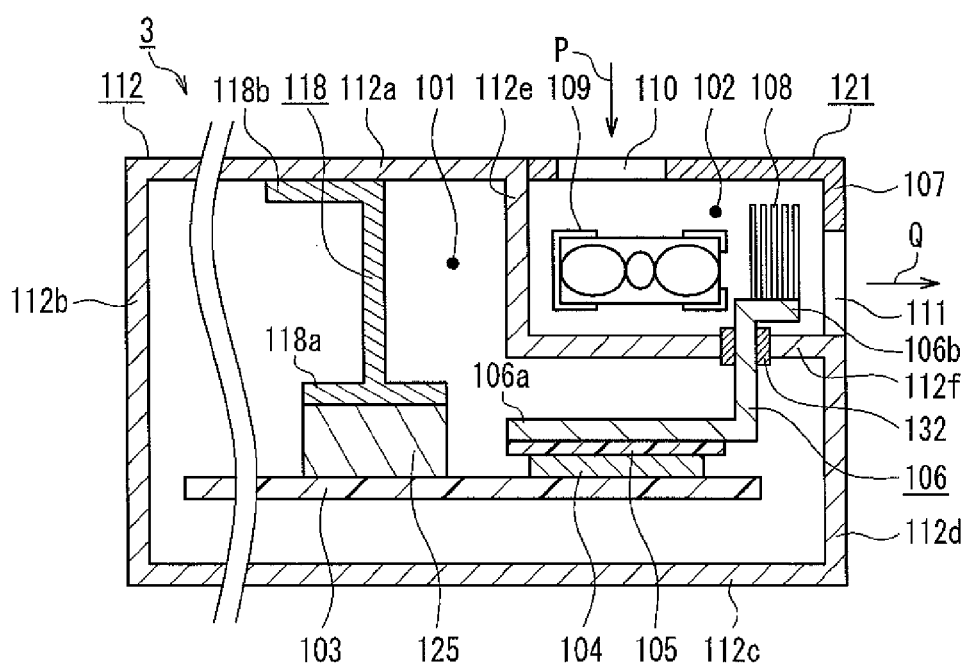
FIG. 11 is a cross-sectional view showing a notebook personal computer according to Embodiment 10.

FIG. 11 is a cross-sectional view showing a cooling structure according to Embodiment 10, taken along the line Z-Z in FIG. 1 for showing the vicinity of the exhaust port 3f and the intake port 3h. In FIG. 11, components similar to those in FIG. 9 are assigned with common marks to avoid duplicated explanation.

The configuration as shown in FIG. 11 is distinguished from the configuration as shown in FIG. 9 in that the end part 118b of the sub-heat pipe 118 is connected thermally to the isolation wall 112a.

One end part 118a of the sub-heat pipe 118 is connected thermally to the HDD 125 and the other end part 118b is connected thermally to the isolation wall 112a. For the connection between the sub-heat pipe 118 and the isolation wall 112a, any coupling means such as biasing, screwing, brazing or welding can be used individually or in combination. It is also effective to fill the interface between the sub-heat pipe 118 and the isolation wall 112a with for example thermoconductive silicone grease or the like. In the present embodiment, the interface between the sub-heat pipe 118 and the isolation wall 112a is filled with silicone grease and then the components are joined by screwing and fixed to each other.

The HDD 125 operates under the command from the CPU 104. When an operation command is sent from the CPU 104, the motor acts for rotating the magnetic disk at high speed, and thus the HDD 125 generates heat. The heat generated by the HDD 125 is conducted to the isolation wall 112a via the sub-heat pipe 118. The CPU 104 operates steadily while the PC 1 is in an active state, and generates heat as a result of the operation. The heat generated by the CPU 104 is conducted to the heat-radiating fin 108 via the heat pipe 106. In general, the CPU 104 generates more heat than the HDD 125.

In a case of conducting the heat generated by the CPU 104 and the heat generated by the HDD 125 to one partition via the heat pipe, for example, the heat generated by the CPU 104 might be conducted toward the HDD 125 side via the heat pipe 106, the partition, and the sub-heat pipe 118. If the HDD 125 is in a stopped state for example, the heat radiation efficiency of the CPU 104 might be improved further due to the thermal conduction. However, if the HDD 125 generates heat in the active state, the heat radiation path in the sub-heat pipe 118 would be backwards to considerably degrade the heat radiation efficiency at the HDD 125. For suppressing the thermal backflow phenomenon, in the present embodiment, the sealant 132 is provided between the heat pipe 106 and the partition 112f so as to thermally divide the heat pipe 106 and the first cabinet 112. Due to this configuration, the heat generated by each of the CPU 104 and the HDD 125 can be radiated independently in accordance with the thermal gradient provided for each of the airflow paths.

The cooling operation of the main unit 3 as shown in FIG. 11 will be described below.

The heat generated by the CPU 104 is conducted to the heat pipe 106 via the thermoconductive sheet 105. The heat conducted to the heat pipe 106 is conducted to the heat-radiating fin 108. As the heat-radiating fin 108 is arranged in the ventilation path formed by the cooling fan 109 from the intake port 110 to the exhaust port 111 as indicated with arrows P and Q, efficient cooling can be achieved. Therefore, a temperature gradient is formed in the order of the CPU 104, the heat pipe 106, and the heat-radiating fin 108, the efficiency in removing the heat generated by the CPU 104 can be set high constantly.

Further, the first chamber 101 is a sealed space. Therefore, even when the PC 1 is used in an adverse environment such as during a rainfall, a liquid such as moisture will enter only the second chamber 102 via the intake port 110 or the exhaust port 111 but hardly enters the first chamber 101. As a result, there is an extremely low possibility that the liquid contacts with the electric components such as the CPU 104 arranged in the first chamber 101, and damage to the electric components can be prevented.

Further, since the cooling fan 109 is arranged in the second chamber 102 independent from the first chamber 101 where the CPU 104 and electronic circuits such as the circuit board 103 are arranged, there is a very low possibility of damage caused by adherence of foreign matters mixed in the cooling air sucked from the intake port 110.

The heat conducted from the HDD 125 to the sub-heat pipe 118 is conducted to the isolation wall 112a. The heat conducted to the isolation wall 112a is radiated toward the interior of the first chamber 101 and also toward the interior of the second chamber 102. Thereby, the isolation wall 112a is cooled.

Since the isolation wall 112a is a part of the first cabinet 112, the heat conducted to the isolation wall 112a is conducted also to the isolation wall 112b, the isolation wall 112c, the isolation wall 112d, the partition 112e and the partition 112f. The first cabinet 112 with a large thermal capacity acts as a heat sink. As a result, a temperature gradient is formed in the order of the HDD 125, the sub-heat pipe 118 and the isolation wall 112a, and thus the HDD 125 can be cooled efficiently.

Furthermore, since the sealant 132 is arranged between the heat pipe 106 and the partition 112f, the heat of the heat pipe 106 is not conducted to the partition 112f. Similarly, the heat conducted from the sub-heat pipe 118 to the first chamber 112 is not conducted to the heat pipe 106.

Since the sub-heat pipe 118 is arranged inside the sealed first cabinet 112, the waterproof property and the dustproof property are ensured. Therefore, according to the present embodiment, a cooling structure with ensured waterproof property and dustproof property can be provided.

Since the first cabinet 112 is formed of the isolation walls 112a, 112b, 112c, 112d and the partitions 112e, 112f in the present embodiment, the mechanical strength against drop impact that may be applied to the PC 1 is high.

The sealant 132 is not limited particularly as long as the heat pipe 106 and the partition 112f are configured watertight. For this purpose, a mechanically hard layer of a waterproof adhesive or silicone-based filler, or a buffer layer having rubber elasticity such as a so-called "bush" can be used. It is particularly preferable to apply a watertight buffer material, since a configuration with excellent resistance against disturbance such as dropping can be provided. In the present embodiment, a silicone rubber buffer was applied.

(Embodiment 11)

Figure 12:
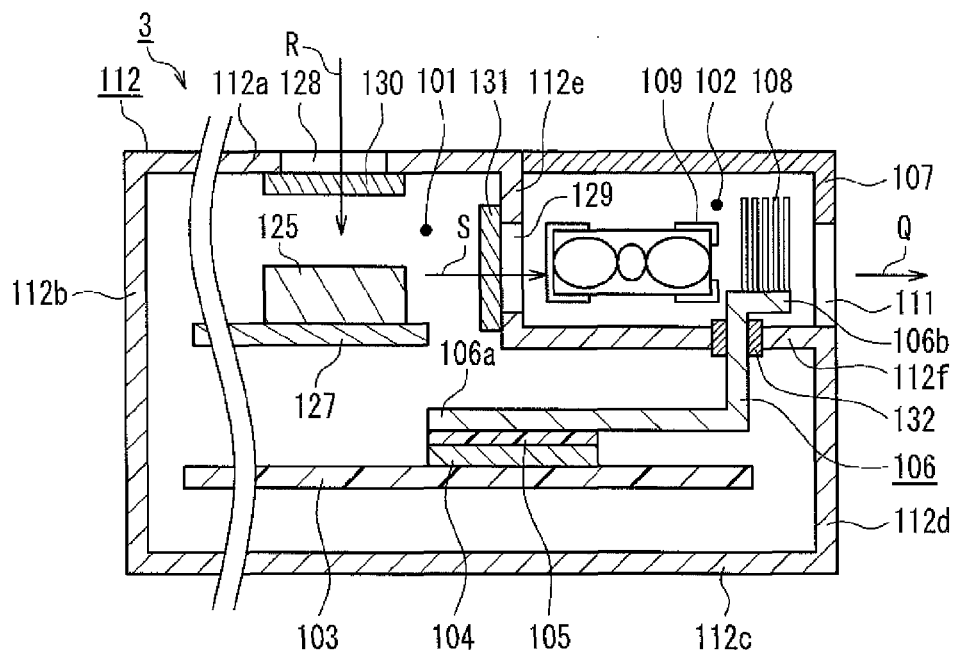
FIG. 12 is a cross-sectional view showing a notebook personal computer according to Embodiment 11.

FIG. 12 is a cross-sectional view showing a cooling structure according to Embodiment 11, taken along the line Z-Z in FIG. 1 for showing the vicinity of the exhaust port 3f and the intake port 3h. In FIG. 12, components similar to those in FIG. 2 are assigned with common marks to avoid duplicated explanation.

The configuration as shown in FIG. 12 is distinguished from the configuration as shown in FIG. 2 in that a hard disk drive (HDD) 125, a circuit board 127, a first open hole 128, a second open hole 129, a first pertheable membrane 130, a second permeable membrane 131 and a sealant 132 are provided. As the configuration of HDD 125 has been explained in Embodiment 7, duplicated explanation is avoided in the present embodiment.

One end part 106a of the heat pipe 106 is connected thermally to the CPU 104. The other end part 106b of the heat pipe 106 penetrates the partition 112f and is located inside the second chamber 102. The heat-radiating fin 108 is connected thermally to the end part 106b of the heat pipe 106. The heat pipe 106 and the heat-radiating fin 108 are connected thermally to each other by, for example; integrally forming the heat pipe 106 and the heat-radiating fin 108; implanting respective fins of the heat-radiating fin 108 into the grooves or the like formed on the heat pipe 106; preparing a heat pipe 106 and a heat-radiating fin 108 independently and integrating them by brazing, welding or the like; or, filling the interface between the heat pipe 106 and the heat-radiating fin 108 with thermoconductive silicone grease or the like and fastening these components to each other by screwing, biasing or the like. In the present embodiment, the interface between the heat pipe 106 and the heat-radiating fin 108 prepared independently from a physical viewpoint is filled with thermoconductive silicone grease, and then the two components are fastened and fixed to each other.

In the present embodiment, the heat pipe 106 penetrates the partition 112f. The second chamber 102 is connected spatially with the exterior via the exhaust port 111. The sealant 132 is arranged between the partition 112f and the heat pipe 106. Therefore, the first chamber 101 can have a watertight structure due to the sealant 132 arranged between the open hole of the partition 112f and the heat pipe 106.

The sealant 132 is not limited particularly as long as the heat pipe 106 and the partition 112f are configured watertight. For this purpose, a mechanically hard layer of a waterproof adhesive or silicone-based filler, or a buffer layer having rubber elasticity so-called "bush" can be used. It is particularly preferable to apply a watertight buffer material, since a configuration with excellent resistance against disturbance such as dropping can be provided. In the present embodiment, a silicone rubber buffer was applied.

The first open hole 128 is formed in the isolation wall 112a. The first open hole 128 links spatially the first chamber 101 and the exterior. The second open hole 129 is formed in the partition 112e. The second open hole 129 links spatially the first chamber 101 and the second chamber 102. The first permeable membrane 130 is arranged at a location to close the first open hole 128. The second permeable membrane 131 is arranged at a location to close the second open hole 129. The first permeable membrane 130 and the second permeable membrane 131 are membranes that can pass only gaseous molecules but not liquids like water. Examples of the materials for the first permeable membrane 130 and the second permeable membrane 131 include a waterproof and moisture-permeable member made of a composite material of polytetrafluoroethylene and polyurethane formed with microporous holes of 1.4 billion/cm$^2$.

The cooling operation of the main unit 3 as shown in FIG. 12 will be described below.

The heat generated by the CPU 104 is conducted to the heat pipe 106 via the thermoconductive sheet 105. The heat conducted to the heat pipe 106 is conducted to the heat-radiating fin 108. The heat conducted to the heat-radiating fin 108 is air-cooled forcibly by the cooling fan 109. By operating the cooling fan 109, the external cooling air enters the first chamber 101 (arrow R) via the first open hole 128 and the first permeable membrane 130, and then enters the second chamber 102 (arrow S) via the second open hole 129 and the second permeable membrane 131. The cooling air that has entered the second chamber 102 collides with the heat-radiating fin 108 so as to remove the heat of the heat-radiating fin 108, and then is exhausted to the exterior via the exhaust port 111.

The HDD 125 generates less heat than the CPU 104, and furthermore, the heat generation operation is intermittent. Therefore, the airflows as indicated with arrows R and S are sufficient to cool the HDD 125.

The HDD 125, which is arranged in the airflow path of the cooling air indicated with arrows R and S, is cooled since its own heat is removed by the cooling air that enters the first chamber 101 via the first open hole 128. According to the structure, it is possible to cool efficiently the CPU 104 and the HDD 125 with the single heat pipe 106.

According to the present embodiment, the heat generated by the CPU 104 is conducted thermally to the heat-radiating fin 108 via the heat pipe 106, and the heat-radiating fin 108 is cooled forcibly by the cooling fan 109. As a result, the heat from the CPU 104 that generates the largest amount of heat can be cooled efficiently.

Furthermore, the HDD 125 arranged in the watertight first chamber 101 can radiate heat in a heat-radiating path independent from the CPU 104, by convection or the like of the cooling air that flows in the first airflow path. Therefore, the temperature gradient can be ensured even for the members like the HDD 125 that generate heat intermittently.

Further, the first chamber 101 has a watertight structure. Therefore, even when the PC 1 is used in an adverse environment such as during a rainfall, moisture enters only the second chamber 102 but hardly contacts with the PC's internal electronic circuits such as the CPU 104. Further, since the cooling fan 109 is arranged in the second chamber 102 that is independent spatially from the first chamber 101, there is a low possibility of damage caused by adherence of foreign matters mixed in the cooling air sucked from the intake port 110.

In the present embodiment, the first permeable membrane 130 is adhered to the inner surface of the isolation wall 112a (facing the first chamber 101). Alternatively, the first permeable membrane 130 may be adhered to the outer surface of the isolation wall 112a. The second permeable membrane 131 is adhered to a surface of the partition 112e facing the first chamber 101. Alternatively, the second permeable membrane 131 may be adhered to a surface of the partition 112e facing the second chamber 102.

(Embodiment 12)

Figure 13:
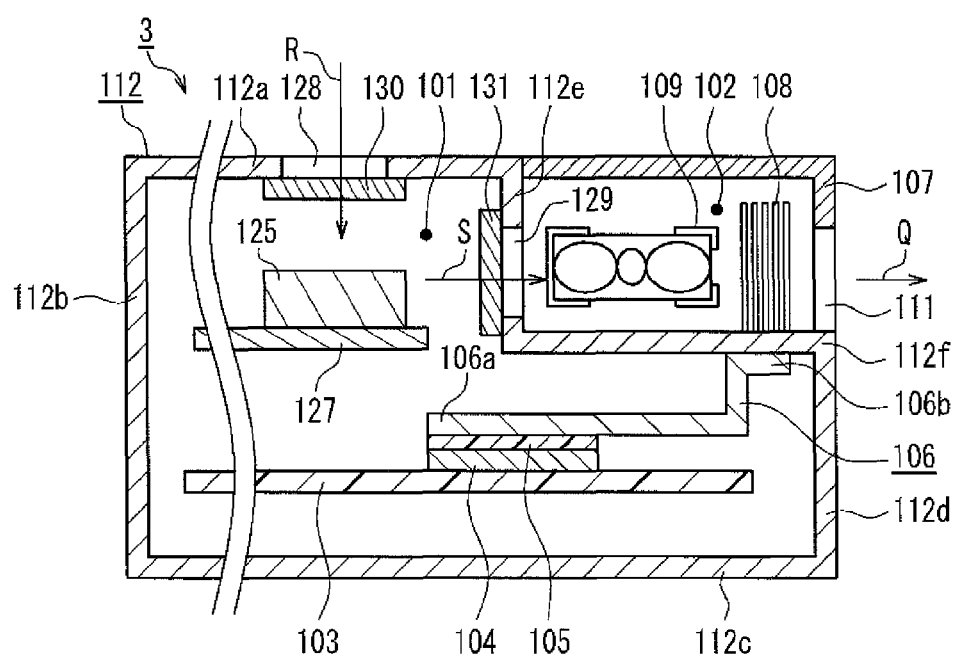
FIG. 13 is a cross-sectional view showing a notebook personal computer according to Embodiment 12.

FIG. 13 is a cross-sectional view showing a cooling structure according to Embodiment 12, taken along the line Z-Z in FIG. 1 for showing the vicinity of the exhaust port 3f and the intake port 3h. In FIG. 13, components similar to those in FIG. 12 are assigned with common marks to avoid duplicated explanation.

The configuration as shown in FIG. 13 is distinguished from the configuration as shown in FIG. 12 in that one end part 106b of the heat pipe 106 is connected thermally to one surface of the partition 112f and the heat-radiating fin 108 is connected thermally to the other surface of the partition 112f. Namely, the heat pipe 106 does not penetrate the partition 112f.

The heat pipe 106 is connected thermally to the heat-radiating fin 108 and to the partition 112f by, for example: filling the interface between the heat pipe 106 and the partition 112f with an electroconductive silicone grease or the like and screwing; forming integrally the heat pipe 106 and the partition 112f; forming integrally the partition 112f and the heat-radiating fin 108; implanting respective fins of the heat-radiating fin 108 into the grooves or the like formed on the partition 112f; preparing the partition 112f and the heat-radiating fin 108 independently and integrating these components by brazing, welding or the like; or, filling the interface between the partition 112f and the heat-radiating fin 108 with thermoconductive silicone grease or the like and joining these components by screwing, biasing or the like. In the present embodiment, the interface between the heat pipe 106 and the partition 112f was filled with thermoconductive silicone grease, and then the heat pipe 106 was joined to the partition 112f by screwing and fixed thereto: Further, the interface between the partition 112f and the heat-radiating fin 108 was filled with thermoconductive silicone grease, and then the heat-radiating fin 108 was joined to the partition 112f by screwing and fixed thereto.

Though the partition 107 is prepared separately from the partition 112e and the partition 112f in the present embodiment, the components can be formed integrally in an alternative example.

The cooling operation of the main unit 3 as shown in FIG. 13 will be described below.

The heat generated by the CPU 104 is conducted to the heat pipe 106 via the thermoconductive sheet 105. The heat conducted to the heat pipe 106 is conducted to the partition 112f. Since the heat-radiating fin 108 is connected thermally to the partition 112f, the heat conducted to the partition 112f is conducted to the heat-radiating fin 108. Heat of the heat-radiating fin 108 is removed by the cooling air flowing in the airflow paths indicated with arrows R, S and Q due to the operation of the cooling fan 109, and thus the heat-radiating fin 108 is cooled. At this time, the cooling air enters the first chamber 101 via the first open hole 128 and the first permeable membrane 130, and further enters the second chamber 102 via the second open hole 129 and the second permeable membrane 131. The cooling air is then exhausted from the second chamber 102 to the exterior via the exhaust port 111.

The HDD 125 arranged in the airflow path of the cooling air is cooled since its own heat is removed by the cooling air entering the first chamber 101 from the exterior.

According to the present embodiment, the heat generated by the CPU 104 is conducted thermally to the heat-radiating fin 108 via the heat pipe 106, and the heat-radiating fin 108 is cooled due to the cooling air provided by the operation of the cooling fan 109. As a result, the heat from the CPU 104 that generates the largest amount of heat can be cooled efficiently.

Furthermore, heat of the HDD 125 arranged in the watertight first chamber 101 is cooled since its own heat is removed due to convection or the like by the cooling air that flows in the first airflow path. Therefore, the temperature gradient can be ensured even for the members like the HDD 125 that generate heat intermittently.

Further, the first chamber 101 has a watertight structure. Therefore, even when the PC is used in an adverse environment such as during a rainfall, moisture enters only the second chamber 102 but hardly contacts with the PC's internal electronic circuits such as the CPU 104. Further, since the cooling fan 109 is arranged in the second chamber 102 that is independent spatially from the first chamber 101, there is a low possibility of damage caused by adherence of foreign matters mixed in the cooling air sucked from the intake port 110.

(Embodiment 13)

Figure 14:
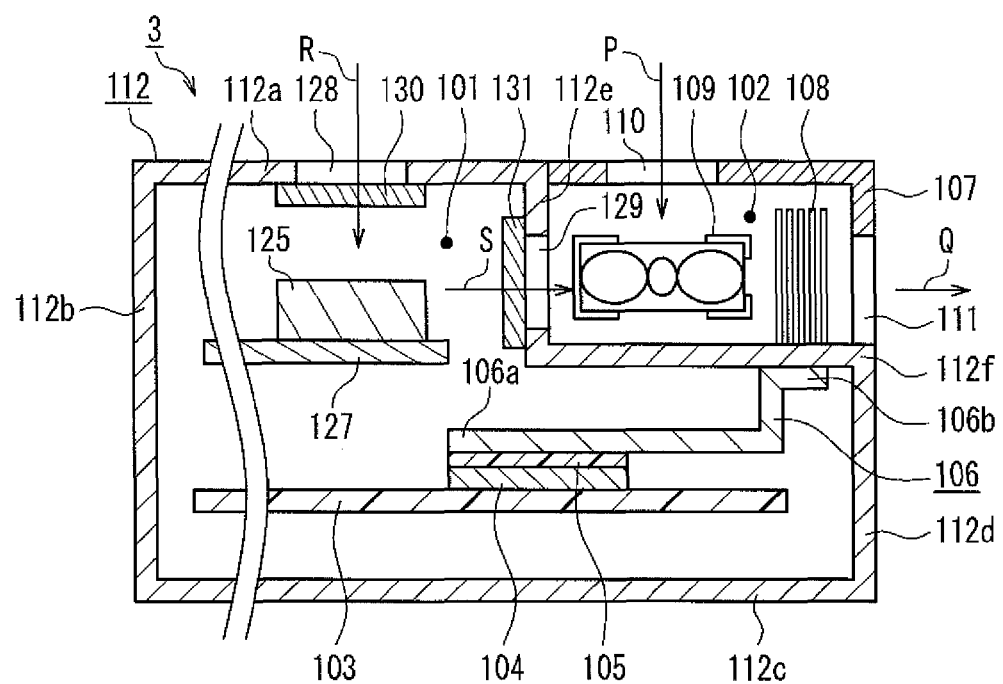
FIG. 14 is a cross-sectional view showing a notebook personal computer according to Embodiment 13.

FIG. 14 is a cross-sectional view showing a cooling structure according to Embodiment 13, taken along the line Z-Z in FIG. 1 for showing the vicinity of the exhaust port 3f and the intake port 3h. In FIG. 14, components similar to those in FIG. 13 are assigned with common marks to avoid duplicated explanation.

The configuration as shown in FIG. 14 is distinguished from the configuration as shown in FIG. 13 in that the housing 107 is provided with the intake port 110. The second chamber 102 communicates with the outside atmosphere through the intake port 110 and the exhaust port 111.

Since the second open hole 129 is closed with the second permeable membrane 131, any liquid such as water will not enter the first chamber 101 via the second open hole 129, and thus the first chamber 101 can have a watertight structure. Since both the first permeable membrane 130 and the second permeable membrane 131 do not pass liquids such as water but pass only gases, the interior of the first chamber 101 can be cooled while maintaining the watertight structure of the first chamber 101.

Though the housing 107 is prepared separately from the partitions 112e and 112f in the present embodiment, the components may be formed integrally in an alternative example.

The cooling operation of the main unit 3 as shown in FIG. 14 will be described below.

The heat generated by the CPU 104 is conducted to the heat pipe 106 via the thermoconductive sheet 105. The heat conducted to the heat pipe 106 is conducted to the partition 112f, and then to the heat-radiating fin 108. The heat conducted to the heat-radiating fin 108 is removed forcibly by the cooling fan 109.

The airflow path of cooling air in the present embodiment is composed of a first airflow path and a second airflow path. The first airflow path is an airflow path of cooling air that flows in the order of the first open hole 128, the first permeable membrane 130, the first chamber 101, the second open hole 129, the second permeable membrane 131, the second chamber 102, and the exhaust port 111 (the airflow path indicated with arrows R, S, Q). The second airflow path is an airflow path of cooling air that flows in the order of the intake port 110, the second chamber 102, and the exhaust port 111. Since the second airflow path is predominant among these two airflow paths, the heat generated by the CPU 104 is removed more efficiently by the heat-radiating fin 108. On the other hand, the HDD 125 is cooled with the cooling air that flows in the first airflow path.

According to the present embodiment, the heat generated by the CPU 104 is conducted thermally to the heat-radiating fin 108 via the heat pipe 106, and the heat-radiating fin 108 is cooled forcibly by the cooling fan 109. As a result, the heat from the CPU 104 that generates the largest amount of heat can be cooled efficiently.

Furthermore, the HDD 125 arranged in the watertight first chamber 101 can radiate heat in a heat-radiating path independent from the CPU 104, by convection or the like due to cooling air that flows in the first airflow path. Therefore, the temperature gradient can be ensured even for the components like the HDD 125 that generate heat intermittently.

Further, the first chamber 101 has a watertight structure. Therefore, even when the PC is used in an adverse environment such as during a rainfall for example, moisture enters only the second chamber 102, but there is a very low possibility that the liquid contacts with the PC's internal electronic circuits such as the CPU 104. Further, since the cooling fan 109 is arranged in the second chamber 102 that is independent spatially from the first chamber 101, there is a very low possibility of damage caused by adherence of foreign matters mixed in the cooling air sucked from the intake port 110.

The intake port 110 shown in each of FIGS. 2-11 and FIG. 14 is provided to the housing 107 in order to take the outside air into the second chamber 102. However, since a typical notebook personal computer is assembled by joining a plurality of cabinets, minute clearances often exist at the joints between the cabinets due to variations or the like in the size of the cabinets. In many cases, the minute clearance allows the outside air to pass, and thus the outside air can be taken into the cabinet (second chamber 102) without providing a special intake port to the cabinet. Therefore, the intake port 110 as shown in the present embodiment is not an essential structure. Namely, an electronic apparatus having a cabinet structure without any intentional intake port is included in the electronic apparatuses according to the present embodiment. If the minute clearance communicates spatially with the second chamber 102, it is possible to take the outside air into the second chamber 102 so as to cool the heat-radiating fin 108 or the like, and to ensure the watertight structure of the first chamber 101.

The CPU 104 in each of the above Embodiments is an example of the heat generator. The first chamber 101 in each of the above Embodiments is an example of the first chamber. The second chamber 102 in each of the above Embodiments is an example of the second chamber. Each of the partitions 112e, 112f, 114, 116, and 122 is an example of the partition. Each of the isolation walls 112a, 112b, 112c and 112d is an example of the isolation wall. The first cabinet 112 in each of the above Embodiments is an example of the first cabinet. The second cabinet 113 in each of the above Embodiments is an example of the second cabinet. Each of the intake ports 3h and 110 in each of the above Embodiments is an example of the intake port. Each of the exhaust ports 3f and 111 in each of the above Embodiments is an example of the exhaust port. The heat pipe 106 in each of the above Embodiments is an example of the thermoconductive member. The housing 107 in each of the above Embodiments is an example of the housing. The sub-heat pipe 118 in each of the above Embodiments is an example of the sub-thermoconductive member. The heat-radiating fin 108 in each of the above Embodiments is an example of the heat collecting-radiating member. The cooling fan 109 in each of the above Embodiments is an example of the blower. Each of the sealants 117 and 132 in each of the above Embodiments is an example of the sealant. The thermal insulator 124 in each of the above Embodiments is an example of the thermal insulator. The first open hole 128 in each of the above Embodiments is an example of the first opening. The second open hole 129 in each of the above Embodiments is an example of the second opening. The first permeable membrane 130 in each of the above Embodiments is an example of the first permeable membrane. The second permeable membrane 131 in each of the above Embodiments is an example of the second permeable membrane.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic apparatus comprising:
   a first housing;
   a second housing hingedly mounted to the first housing and comprising a display unit,
   the first housing comprising:
   a first chamber in which a heat generator is provided;
   a second chamber, in which an air blower and a heat collecting-radiating member are provided;
   a thermoconductive member connected thermally to the heat generator and the heat collecting-radiating member;
   an outer wall isolating the first and second chambers from the exterior of the first housing and having an exhaust port that communicates the second chamber to the exterior of the first housing; and
   an interior partition wall isolating the first chamber from the second chamber,
   the interior partition wall comprising a first section accepting the thermoconductive member and a second section in butt contact with the first section,
   the air blower drawing air into the second chamber and expelling air from the second chamber to remove heat from the heat collecting-radiating member.

2. The electronic apparatus according to claim 1, wherein an intake port penetrates at least one of the outer wall and the interior partition for communication with the second chamber.

3. The electronic apparatus according to claim 1, further comprising a sub-thermoconductive member connected thermally to the heat generator and to the outer wall.

4. The electronic apparatus according to claim 1, further comprising a sub-heat generator independent of the heat generator, and a sub-thermoconductive member connected thermally to the outer wall and to the sub-heat generator.

5. The electronic apparatus according to claim 1, further comprising a sub-thermoconductive member connected thermally to the second section of the interior partition.

6. The electronic apparatus according to claim 1, wherein the thermoconductive member penetrates the first section of the interior partition so as to reach the heat collecting-radiating member inside the second chamber.

7. The electronic apparatus according to claim 1, wherein the thermoconductive member comprises a copper pipe.

8. The electronic apparatus according to claim 1, wherein the heat collecting-radiating member is disposed between an outlet of the blower and the exhaust port.

9. The electronic apparatus according to claim 1, wherein the first and second sections of the interior partition wall are in butt contact through a sealant.

10. The electronic apparatus according to claim 2, wherein the intake port penetrates the interior partition, and a permeable membrane is arranged to close the intake port and to permit passage of only gaseous molecules.

11. The electronic apparatus according to claim 10, wherein a further intake port for introducing outside air to the second chamber is present.

12. The electronic apparatus according to claim 2, wherein the first housing comprises opposed main faces and side surfaces extending between the main surfaces, the blower draws air into the second chamber from one of the main faces and exhausts air from the second chamber from one of the side surfaces.

* * * * *